(12) United States Patent
Harty et al.

(10) Patent No.: US 9,222,620 B2
(45) Date of Patent: Dec. 29, 2015

(54) METHOD AND SYSTEM FOR TANK REFILLING

(71) Applicant: Honda Motor Co., Ltd., Tokyo (JP)

(72) Inventors: Ryan Harty, Long Beach, CA (US); Steve Mathison, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 14/280,550

(22) Filed: May 16, 2014

(65) Prior Publication Data

US 2014/0251495 A1    Sep. 11, 2014

Related U.S. Application Data

(62) Division of application No. 12/982,966, filed on Dec. 31, 2010, now Pat. No. 8,783,303.

(60) Provisional application No. 61/332,919, filed on May 10, 2010, provisional application No. 61/326,375, filed on Apr. 21, 2010.

(51) Int. Cl.
   *F17C 13/02*    (2006.01)
   *F17C 5/00*     (2006.01)
   *F17C 5/06*     (2006.01)

(52) U.S. Cl.
   CPC ............... *F17C 13/023* (2013.01); *F17C 5/007* (2013.01); *F17C 5/06* (2013.01); *F17C 13/025* (2013.01);
   (Continued)

(58) Field of Classification Search
   CPC .......... F17C 5/007; F17C 5/06; F17C 13/023; F17C 13/025; F17C 13/026
   USPC ................. 141/2, 3, 4, 11, 20, 82, 83, 94, 95
   See application file for complete search history.

(56) References Cited

U.S. PATENT DOCUMENTS

| | | | |
|---|---|---|---|
| 3,536,109 A | 10/1970 | Ginsburgh et al. | |
| 4,347,472 A | 8/1982 | Lemelson | |

(Continued)

FOREIGN PATENT DOCUMENTS

| | | |
|---|---|---|
| CN | 1826492 A | 8/2006 |
| CN | 101087975 A | 12/2007 |

(Continued)

OTHER PUBLICATIONS

Non final Office Action for U.S. Appl. No. 12/982,966 dated Oct. 2, 2013.

(Continued)

*Primary Examiner* — Timothy L Maust
(74) *Attorney, Agent, or Firm* — Rankin, Hill & Clark LLP

(57) ABSTRACT

Disclosed is a simple, analytical method that can be utilized by hydrogen filling stations for directly and accurately calculating the end-of-fill temperature in a hydrogen tank that, in turn, allows for improvements in the fill quantity while tending to reduce refueling time. The calculations involve calculation of a composite heat capacity value, MC, from a set of thermodynamic parameters drawn from both the tank system receiving the gas and the station supplying the gas. These thermodynamic parameters are utilized in a series of simple analytical equations to define a multi-step process by which target fill times, final temperatures and final pressures can be determined. The parameters can be communicated to the station directly from the vehicle or retrieved from a database accessible by the station. Because the method is based on direct measurements of actual thermodynamic conditions and quantified thermodynamic behavior, significantly improved tank filling results can be achieved.

14 Claims, 18 Drawing Sheets

(52) U.S. Cl.
CPC ....... *F17C 13/026* (2013.01); *F17C 2201/0109* (2013.01); *F17C 2201/054* (2013.01); *F17C 2203/0604* (2013.01); *F17C 2203/0619* (2013.01); *F17C 2203/0624* (2013.01); *F17C 2221/012* (2013.01); *F17C 2221/033* (2013.01); *F17C 2223/0123* (2013.01); *F17C 2223/0153* (2013.01); *F17C 2223/0161* (2013.01); *F17C 2223/036* (2013.01); *F17C 2225/0123* (2013.01); *F17C 2225/036* (2013.01); *F17C 2250/043* (2013.01); *F17C 2250/0439* (2013.01); *F17C 2250/0443* (2013.01); *F17C 2250/0491* (2013.01); *F17C 2250/0495* (2013.01); *F17C 2250/0631* (2013.01); *F17C 2250/0694* (2013.01); *F17C 2260/022* (2013.01); *F17C 2260/023* (2013.01); *F17C 2260/025* (2013.01); *F17C 2260/026* (2013.01); *F17C 2265/065* (2013.01); *F17C 2270/0139* (2013.01); *F17C 2270/0168* (2013.01); *F17C 2270/0176* (2013.01); *Y02E 60/321* (2013.01)

(56) References Cited

U.S. PATENT DOCUMENTS

| | | | |
|---|---|---|---|
| 4,398,172 A | 8/1983 | Carroll et al. |
| 4,490,798 A | 12/1984 | Franks et al. |
| 4,527,600 A | 7/1985 | Fisher et al. |
| 4,934,419 A | 6/1990 | Lamont et al. |
| 5,058,044 A | 10/1991 | Stewart et al. |
| 5,202,617 A | 4/1993 | Nor |
| 5,204,819 A | 4/1993 | Ryan |
| 5,238,030 A | 8/1993 | Miller et al. |
| 5,259,424 A | 11/1993 | Miller et al. |
| 5,327,066 A | 7/1994 | Smith |
| 5,359,522 A | 10/1994 | Ryan |
| 5,479,966 A | 1/1996 | Tison et al. |
| 5,564,306 A | 10/1996 | Miller |
| 5,569,922 A | 10/1996 | Clarke |
| 5,570,729 A | 11/1996 | Mutter |
| 5,594,318 A | 1/1997 | Nor et al. |
| 5,602,745 A | 2/1997 | Atchley et al. |
| 5,628,349 A | 5/1997 | Diggins et al. |
| 5,750,995 A | 5/1998 | Clarke |
| 5,762,118 A | 6/1998 | Epworth et al. |
| 5,868,176 A | 2/1999 | Barajas et al. |
| 5,868,179 A | 2/1999 | Hartsell, Jr. |
| 5,881,779 A | 3/1999 | Kountz et al. |
| 5,956,259 A | 9/1999 | Hartsell, Jr. et al. |
| 5,970,786 A | 10/1999 | Smith et al. |
| 5,971,042 A | 10/1999 | Hartsell, Jr. |
| 6,024,137 A | 2/2000 | Strnad et al. |
| 6,068,030 A | 5/2000 | Tatsuno |
| 6,070,156 A | 5/2000 | Hartsell, Jr. |
| 6,073,081 A | 6/2000 | Hettinger et al. |
| 6,089,284 A | 7/2000 | Kaehler et al. |
| 6,185,501 B1 | 2/2001 | Smith et al. |
| 6,237,647 B1 | 5/2001 | Pong et al. |
| 6,250,347 B1 | 6/2001 | Tatsuno |
| 6,338,008 B1 | 1/2002 | Kohut et al. |
| 6,343,241 B1 | 1/2002 | Kohut et al. |
| 6,381,514 B1 | 4/2002 | Hartsell, Jr. |
| 6,382,269 B1 | 5/2002 | Tatsuno |
| 6,394,150 B1 | 5/2002 | Haimovich et al. |
| 6,401,767 B1 | 6/2002 | Cohen et al. |
| 6,463,967 B1 | 10/2002 | Boyle |
| 6,497,363 B1 | 12/2002 | Kelrich |
| 6,598,792 B1 | 7/2003 | Michot et al. |
| 6,619,336 B2 | 9/2003 | Cohen et al. |
| 6,672,340 B2 | 1/2004 | Mutter |
| 6,688,342 B2 | 2/2004 | Lewis |
| 6,708,573 B1 | 3/2004 | Cohen et al. |
| 6,727,809 B1 | 4/2004 | Smith |
| 6,745,801 B1 | 6/2004 | Cohen et al. |
| 6,822,551 B2 | 11/2004 | Li et al. |
| 6,964,821 B2 | 11/2005 | Hirakata |
| 7,059,364 B2 | 6/2006 | Kountz et al. |
| 7,171,989 B2 | 2/2007 | Corless et al. |
| 7,406,987 B2 | 8/2008 | Takano et al. |
| 7,412,994 B2 | 8/2008 | Corless et al. |
| 7,523,770 B2 | 4/2009 | Horowitz et al. |
| 7,543,611 B2 | 6/2009 | Kaellberg |
| 7,647,194 B1 | 1/2010 | Casey et al. |
| 7,671,482 B2 | 3/2010 | Tighe |
| 7,820,313 B2 | 10/2010 | Winkler |
| 8,360,112 B2 | 1/2013 | Allidieres et al. |
| 8,517,062 B2 | 8/2013 | Allidieres et al. |
| 8,783,303 B2 * | 7/2014 | Harty ............... F17C 5/007 141/11 |
| 2005/0103400 A1 | 5/2005 | Eichelberger et al. |
| 2005/0178463 A1 | 8/2005 | Kountz et al. |
| 2007/0079892 A1 | 4/2007 | Cohen et al. |
| 2007/0090937 A1 | 4/2007 | Stabler |
| 2008/0000542 A1 | 1/2008 | Cohen et al. |
| 2008/0185068 A1 | 8/2008 | Cohen et al. |
| 2008/0231836 A1 | 9/2008 | Curello et al. |
| 2008/0289720 A1 | 11/2008 | Takano et al. |
| 2009/0044877 A1 | 2/2009 | Faudou et al. |
| 2009/0107577 A1 | 4/2009 | Allidieres et al. |
| 2009/0205745 A1 | 8/2009 | Farese et al. |
| 2010/0121551 A1 | 5/2010 | Boss et al. |
| 2010/0185360 A1 | 7/2010 | Windbergs et al. |
| 2010/0241470 A1 | 9/2010 | Smith |
| 2010/0307636 A1 | 12/2010 | Uemura |
| 2011/0035049 A1 | 2/2011 | Barrett |
| 2011/0100507 A1 | 5/2011 | Weitzhandler et al. |
| 2011/0259469 A1 | 10/2011 | Harty et al. |
| 2012/0267002 A1 | 10/2012 | Kittilsen et al. |

FOREIGN PATENT DOCUMENTS

| | | |
|---|---|---|
| DE | 19643801 A | 5/1998 |
| EP | 0653585 A | 5/1995 |
| EP | 1205704 A | 5/2002 |
| EP | 2093475 A | 8/2009 |
| EP | 1831598 B1 | 1/2011 |
| WO | 2007077376 A | 7/2007 |

OTHER PUBLICATIONS

Search Report from counterpart Chinese Patent Application 2011800308318 issued Jan. 10, 2014.

Office Action of U.S. Appl. No. 13/832,311 dated Oct. 7, 2015, 27 pages.

\* cited by examiner

Test Matrix

|  | Initial Fill Amount | |
|---|---|---|
| Temperature Condition | 2MPa | 1/2 Tank |
| 25C, No Precooling |  |  |
| 25C, -20C Precooling |  |  |

(Static Communication – RFID, Barcode, HVAS, ID-Fill, etc. – Not integrated to ECU)

Knowable by the Vehicle:

- NWP
- Tank Volume
- Max Hot Soak Temperature
- Max Cold Soak Temperature
- Tank MC Characteristics
- Other?

Knowable by the Station:

- Ambient Temperature
- Initial Tank Pressure
- Enthapy of Fill
    - Precooler Output
    - Starting Pressure
    - Ending Pressure

Applying the MC Method – Pressure Target

Text Format

Vehicle

Station

$$T_{init} = T_{ambient} - \Delta T_{cold}, \Delta t = 0$$ Set cold soak temperature $$m_{init} = V \times \rho_{init}(T_{init}, P_{init})$$ Calculate initial cold mass $$m_{add} = m_{cv} - m_{init}$$ Calculate additional mass $$u_{init} = u_{init}(T_{init}, P_{init})$$ Calculate initial internal energy $$h_{avg} = \frac{\Sigma m_{add} h_e(T,P)}{m_{add}}$$ Estimate average enthalpy to be delivered $$u_{adiabatic} = \frac{m_{init} u_{init} + m_{add} h_{avg}}{m_{cv}}$$ Calculate adiabatic internal energy $$T_{adiabatic} = T(\rho_{target}, P_{adiabatic}, u_{adiabatic})$$ Calculate adiabatic temperature $$MC = C + A \frac{U_{adiabatic}}{U_{init}} + g(1 - e^{-k\Delta t})$$ Calculate MC $$T_{final} = \frac{m_{cv} C_v T_{adiabatic} + MC T_{init}}{(MC + m_{cv} C_v)}$$ Calculate $T_{Final}$ $$P_{Target} = P(\rho_{target}, T_{Final})$$ Calculate Pressure Target Where $\rho_{target}$ = 100% SOC

FIG. 14

Step 3) Set Fill Time based on Hot Soak $T_{init} - T_{ambient}$ using $P_{Target}$ from Step 2)

Sets the Expected Outcome with Cold Soak Pressure Target and Hot Soak Fill Speed $T_{init} = T_{ambient}$ — Use ambient temperature $m_{init} = V \times \rho_{init}(T_{init}, P_{init})$ — Calculate initial mass $m_{cv} = V \times \rho_{target}$ — Set target SOC = 100%

$m_{add} = m_{cv} - m_{init}$ — Calculate additional mass $u_{init} = u_{init}(T_{init}, P_{init})$ — Calculate initial internal energy $h_{avg} = \dfrac{\Sigma m_{add} h_e(T,P)}{m_{add}}$ — Estimate average enthalpy to be delivered $u_{adiabatic} = \dfrac{m_{init} u_{init} + m_{add} h_{avg}}{m_{cv}}$ — Calculate adiabatic internal energy $T_{adiabatic} = T(\rho_{target}, P_{adiabatic}, u_{adiabatic})$ — Calculate adiabatic temperature $MC = C + A\dfrac{U_{adiabatic}}{U_{init}} + g(1 - e^{-k\Delta t})^j$ — Calculate MC $T_{final} = \dfrac{m_{cv} C_v T_{adiabatic} + MC T_{init}}{(MC + m_{cv} C_v)}$ — Calculate $T_{Final}$

FIG. 15

$P_{Target} = P(\rho_{target}, T_{Final})$ — Calculate Resulting Pressure Target If $P_{target} > P_{TargetColdSoak}$ from Step 2), reduce $\rho_{target}$ by, for example, 1g/L

35MPa Type 3 Tank Result

| Vehicle Data Toss | Station Data Read |
|---|---|
| 5 MC Parameters (From Testing) | Ambient Temperature |
| Tank Volume | Initial Tank Pressure |
| NWP | |
| Max Hot Soak ΔT=7.5C | Expected Average Nozzle Temperature |
| Cold Soak ΔT=-10C | Nozzle Pressure |

FIG. 16

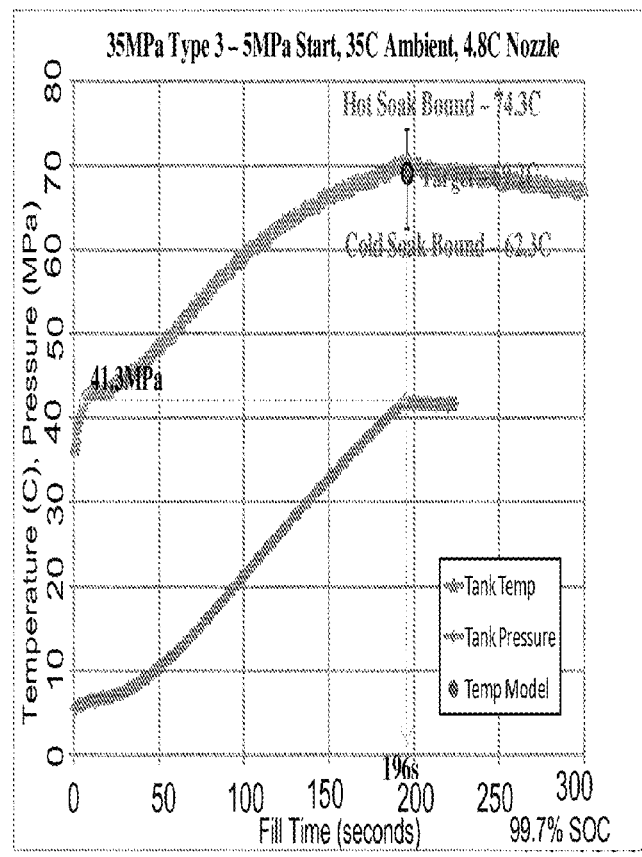

Result of 35MPa Fill 5

1) Calculate Hot Soak Fill Time (Based on 85°C)
2) Calculate Cold Soak Pressure Target (100% Density or MAWP)
3) Calculate Expected Result

70MPa Type 4 Tank Result Filled to 50MPa

| Vehicle Data Toss | Station Data Read |
|---|---|
| 5 MC Parameters (From Testing) | Ambient Temperature |
| Tank Volume | Initial Tank Pressure |
| NWP | |
| Max Hot Soak ΔT=7.5C | Expected Average Nozzle Temperature |
| Cold Soak ΔT=-10C | Nozzle Pressure |

Result of 50MPa Fill 5

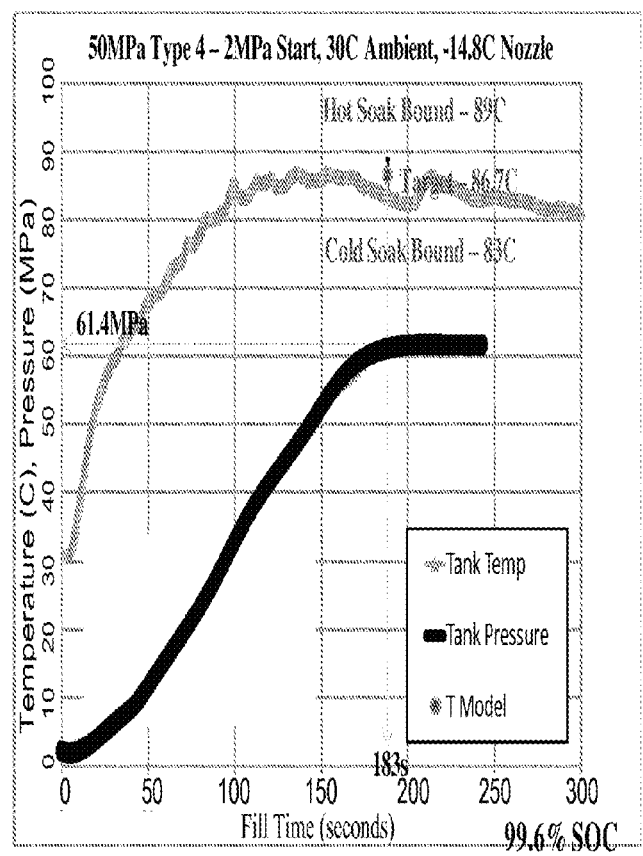

1) Calculate Hot Soak Fill Time (Based on 85°C)
2) Calculate Cold Soak Pressure Target (100% Density or MAWP)
3) Calculate Expected Result

FIG. 17

70MPa Type 4 Tank Result

Vehicle Data Toss    Station Data Read

5 MC Parameters    Ambient
(From Testing)    Temperature

Tank Volume    Initial Tank
     Pressure

NWP

Expected
Max Hot Soak    Average Nozzle
$\Delta T = 7.5C$    Temperature
Cold Soak
$\Delta T = -10C$    Nozzle Pressure

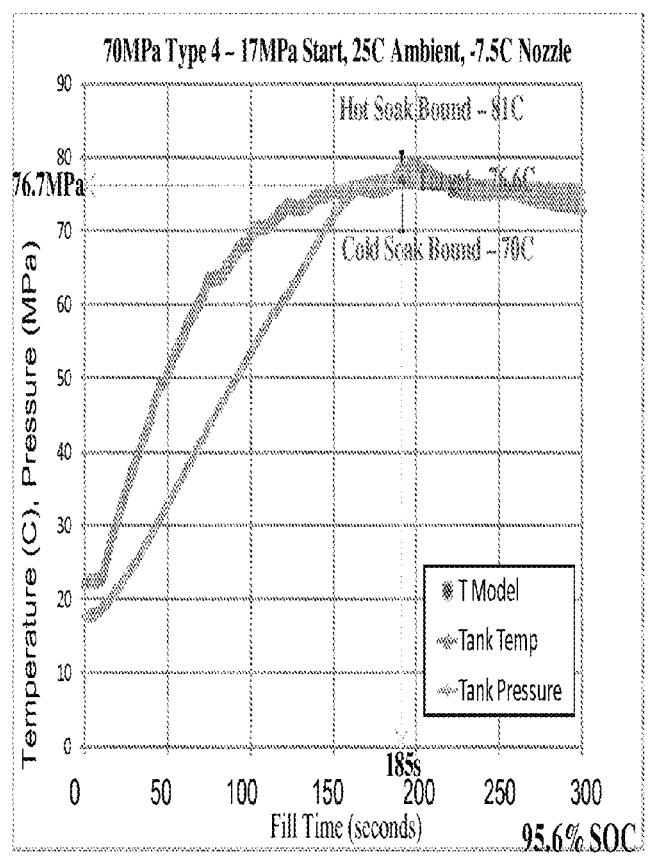

Result of 70MPa Fill 5

1) Calculate Hot Soak Fill Time (Based on 85°C)
2) Calculate Cold Soak Pressure Target (100% Density or MAWP)
3) Calculate Expected Result

FIG. 18

| Fueling Methods (w/ or w/o using 2°C max pre-cooling) | Type 3 Fill Time | Type 3 SOC | Type 4 Fill Time | Type 4 SOC | Station Cost | Station Reliability | Station Design Flexibility |
|---|---|---|---|---|---|---|---|
| Non-Comm J2601 Type B (-20C) | X | O | X | △ | △ | △ | X |
| Non-Comm using MC Method (-20C max but variable) | X | O | X | △ | O | O | O ** |
| Full-Comm J2601 Type B (-20C) | ⊚ | ⊚ | O * | ⊚ | △ | △ | X |
| Full-Comm using MC Method (-20C max but variable) | ⊚ | ⊚ | O * | ⊚ | O | O | O ** |
| ID Fill with MC Method (-20C max but variable) | ⊚ | ⊚ | O * | ⊚ | O | O | O ** |

\* Majority of tank systems
\*\* Station throughput improves since customer can still fuel if pre-cooling capability falls outside the tolerance allowed in J2601. Cost also improves since pre-cooling system can be downsized and operated at optimal temperature.

X = No Good   △ = Ok (acceptable)   O = Good   ⊚ = Excellent

FIG. 22

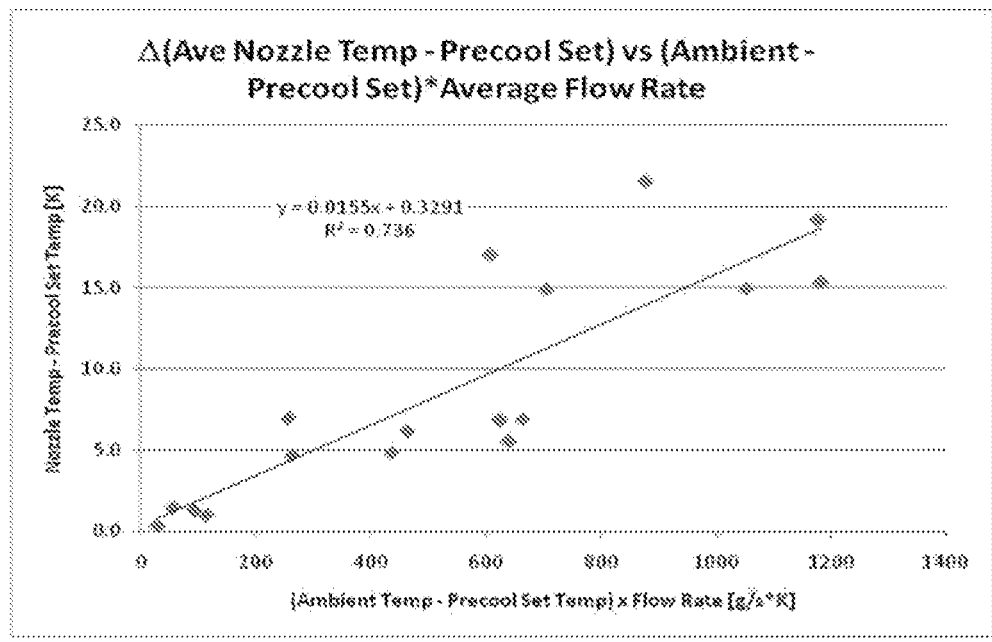

FIG. 23

Internal Energy of Hydrogen u(kJ/kg) = u(T(K),P(MPaa)) = [(-0.000000251102*$P^2$ + 0.00003270544*P + 0.020635744157)*T + (0.000110237178*$P^2$ + -0.014948338423*P + -0.706955972653)]/(2 * 1.00794)*1000

Enthalpy of Hydrogen h(kJ/kg) = h(T(K),P(MPaa)) =(4.92522E-15*P^5 - 0.0000000000016076*P^4 + 0.000000000214858*P^3 - 0.0000000146189*P^2 + 0.000000454324*P^1 - 0.00000987705)*T^3+(0.00000000055184*P^4 - 0.000000141472*P^3 + 0.0000132881*P^2 - 0.000497343*P^1 + 0.0108438)*T^2+(0.00000000202796*P^5 - 0.000000664561*P^4 + 0.0000901478*P^3 - 0.00639724*P^2 + 0.225139*P^1 + 10.4372)*T+(-0.000000255167*P^5 + 0.0000852825*P^4 - 0.0119306*P^3 + 0.894471*P^2 - 27.6592*P^1 + 112.034)

Temperature of Hydrogen T(K) = T(u(kJ/kg),P(MPaa)) = (0.000001148*$P^2$ - 0.000148149*P + 0.0976624642)*u + (-0.0047605417*$P^2$ + 0.6412591317*P + 34.3729762461)

Density of Hydrogen = ρ(kg/m^3) = ρ(T(K),P(MPaa)) = P*1000/((8.314/(2*1.00794))*T*((5.15401806214819E-28*(1.8*T)^4 - 1.3150180571689E-24*(1.8*T)^3 + 1.27273435029312E-21*(1.8*T)^2 - 5.55685616698696E-19*(1.8*T) + 9.24572639059417E-17)*(P*0.145037743897283*1000)^4 + (-1.9122168897314E-23*(1.8*T)^4 + 4.91138876984723E-20*(1.8*T)^3 - 4.79768947207089E-17*(1.8*T)^2 + 2.12330577989168E-14*(1.8*T) - 3.60842277195044E-12)*(P*0.145037743897283*1000)^3 + (2.35758137570084E-19*(1.8*T)^4 - 6.11164262901718E-16*(1.8*T)^3+6.04725560888185E-13*(1.8*T)^2 - 2.72588547111097E-10*(1.8*T) + 4.75813030824455E-08)*(P*0.145037743897283*1000)^2 + (-4.85408615612733E-16*(1.8*T)^4 + 1.2130030793229E-12*(1.8*T)^3 - 1.10759228185334E-09*(1.8*T)^2 + 3.92998672260481E-07*(1.8*T) + 1.92718769514065E-06)*(P*0.145037743897283*1000) + (-5.93033800788672E-14*(1.8*T)^4 + 1.44179866941074E-10*(1.8*T)^3 - 1.30532114392034E-07*(1.8*T)^2 + 0.0000516720636738832*(1.8*T) + 0.992795943835443)))

FIG. 24

METHOD AND SYSTEM FOR TANK REFILLING

PRIORITY STATEMENT

This application is a divisional application of U.S. patent application Ser. No. 12/982,966, filed Dec. 31, 2010, and U.S. patent application Ser. No. 12/982,966 claims benefit under 35 U.S.C. §119(e) of U.S. Provisional Patent Application No. 61/326,375, filed Apr. 21, 2010, and U.S. Provisional Patent Application No. 61/332,919, filed May 10, 2010, the contents of which are incorporated by reference, in their entirety.

BACKGROUND OF THE INVENTION

The safety and convenience of hydrogen tank refueling are recognized as important considerations in determining the ultimate success of hydrogen fueled vehicles in the marketplace. Under current safety guidelines, the refueling of compressed hydrogen tanks are to be conducted in a manner that prevents the tank from overheating (temperatures exceeding 85° C.) during refueling and/or from overfilling the tank to a point at which the pressure could exceed 125% of normal working pressure (NWP) at any time. Because of the number of unknown parameters associated with conventional hydrogen tank refueling procedures, the refueling operations tend to be somewhat conservative, thereby trading performance and efficiency, particularly with respect to end of fill density (SOC %) and/or unnecessary levels of pre-cooling, for an increased safety margin. A SOC of 100%, for example, corresponds to a tank at NWP and 15° C.

This tradeoff is especially significant in non-communication fueling operations in which the parametric assumptions are even more conservative. Because the hydrogen station does not have information about the tank that it is filling, very conservative assumptions need to be made for the system in order to encompass the range of possible tank configurations and initial tank conditions to avoid exceeding the system safety limits. In SAE TIR J2601, the disclosure of which is incorporated herein by reference, in its entirety, these conservative assumptions are incorporated into a series of lookup tables for hydrogen tank filling. Working from parameters including the tank volume, starting pressure, ambient temperature and station pre-cooling set point, the lookup tables are then used for determining a pressure ramp rate and final target pressure. While application of these lookup tables tends to provide for safe refilling under virtually all conditions and for virtually all tank systems, given the conservative nature of the associated assumptions, the resulting hydrogen tank filling operation may take longer, achieve lower final fill pressures and/or require lower hydrogen station pre-cooling temperatures than necessary to fill a particular tank system.

An additional limitation of the refilling procedures defined by SAE TIR J2601 is the lack of any method or procedure for a hydrogen tank filling station to compensate or adjust for situations in which its actual operating conditions fall outside of the allowed tolerances. For example, if the pre-cooling temperature is above the design set point as the result of multiple consecutive refills, the lookup tables defined in SAE TIR J2601 cannot be used. Efforts to avoid this out of specification condition can lead to an overdesigned hydrogen tank filling station (excessive cooling for ensuring that the pre-cooling target temperature is maintained), thereby driving up station cost.

Conversely, failing to ensure that the pre-cooling target temperature is maintained can inconvenience customers that are unable to refill their tanks in a timely manner (as a result of delays waiting for the pre-cooling temperature to come into specification), thereby reducing customer satisfaction, station revenue and/or repeat business. Further, operating a station with a constant pre-cooling temperature regardless of current ambient conditions results in excessive energy usage and reduced well-to-wheel energy efficiency. In order to reduce energy use, a hydrogen tank filling station should be operated at the highest possible pre-cooling temperature that provides both customer-acceptable refueling times and a satisfactory safety margin.

BRIEF SUMMARY

The MC Method as detailed infra provides a new tank filling model based on the total heat capacity of the hydrogen fueling system and an advanced algorithm based on that model for improving the performance of hydrogen filling stations under a broad range of operating conditions. This algorithm, as applied stepwise in the MC Method, can be used to enhance fueling performance pursuant to SAE TIR J2601 through the use of additional thermodynamic information about the tank system. The MC Method works at virtually any tank system Normal Working Pressure (NWP) and with any compressed hydrogen tank system, and it allows fueling at conditions that operate outside of current SAE TIR J2601 tables, such as new stations with −10° C. pre-cooling, or previously existing stations without the pre-cooling capability as specified in SAE TIR J2601. Utilizing the MC Method will permit hydrogen filling stations to improve their fill speed and fill quality (SOC %), while enabling lower cost hydrogen stations to meet those needs.

BRIEF DESCRIPTION OF THE DRAWINGS

Example embodiments described below will be more clearly understood when the detailed description is considered in conjunction with the accompanying drawings, in which:

FIG. 14 illustrates the MC Method second step—determining the pressure target based on using a colder than ambient soak assumption.

FIG. 15 illustrates the MC Method third step, using the pressure target from the second step in determining the expected result and, if in excess of the target pressure, reducing the target density and recalculating in an iterative manner to match the pressure target at the final temperature.

FIG. 16 illustrates the results obtained from a 35 MPa Type 3 Tank Fill under a 35° C. ambient with 5° C. Pre-cooled Hydrogen and 5 MPa Start Pressure. $T_{final}$ target is 69.2° C., bounded by Hot Soak at 74.3° C. and Cold Soak at 62.3° C.

FIG. 17 illustrates Result of 50 MPa Type 4 Tank Fill from 30° C. Ambient with −15° C. Pre-cooled Hydrogen and 2 MPa Start Pressure. $T_{final}$ target is 86.7° C., bounded by Hot Soak at 89.0° C. and Cold Soak at 83.0° C. Note that the target pre-cooling temperature was −20° C., which verified the difficulty in practice of keeping a specified pre-cooling temperature.

FIG. 18 illustrates 70 MPa Type 4 Tank Test from 25° C. Ambient at 17 MPa Start Pressure with −7.5° C. Pre-cooling. $T_{final}$ target is 76.6° C., bounded by Hot Soak at 81.0° C. and Cold Soak at 70.0° C.

FIG. 22 illustrates a comparison of fueling methods showing the impact of adding the MC Method to existing fueling protocols.

FIG. 23 illustrates a relationship between nozzle temperature deviation from pre-cooling temperature, flow rate, pre-cooling temperature, and ambient temperature measured during fill testing. This relationship is, of course, dependent on the specific implementation of components for a given fueling station or test stand.

FIG. 24 illustrates equations of a curve fit to the NIST Hydrogen Property Database for hydrogen gas utilized for determining internal energy (given temperature and pressure), enthalpy (given temperature and pressure), temperature (given internal energy and pressure), and density (given temperature and pressure) of hydrogen gas.

It should be noted that these Figures are intended to illustrate the general characteristics of methods, structure and/or materials utilized in the example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

The goal of the methods and systems detailed in this disclosure are to provide and utilize both a filling model and an associated algorithm that can be used by a hydrogen tank filling station or, indeed, any gas tank filling operation, to improve the accuracy of the end-of-fill temperature and pressure for a range of hydrogen tanks and a range of ambient and operating conditions. Implementation of the methods and systems detailed below during hydrogen tank refueling events will improve the efficiency, accuracy and/or safety of the refueling operation by avoiding overfilling and avoiding overheating the hydrogen tank.

Accurately estimating the end-of-fill temperature of a refueling event is difficult, which is why communication refueling has been developed, where temperature and pressure information is directly transmitted to the hydrogen tank filling station via one or more communication device(s) including, for example, the Infrared Data Association (IRDA) interface detailed in SAE TIR J2799, the disclosure of which is incorporated herein by reference, in its entirety. The corresponding lack of such temperature and pressure information is the reason that non-communication fueling protocols requires large margin of safety, particularly given the additional unknown parameters including, for example, the tank type, the tank size, the aspect ratio, the number of tanks, hot or cold soak status. Although full-communication fueling can be used to provide the tank parametric data to the hydrogen tank filling station, full-communications fueling adds more cost and complexity to both the station and the vehicle and raises additional concerns, particularly with regard to the use of in-tank sensors. Accordingly, there remains a need for a method that provides for sufficiently accurate predictions regarding the temperature of the hydrogen in the tank during refueling without requiring full-communication protocols and hardware.

Figure 1:
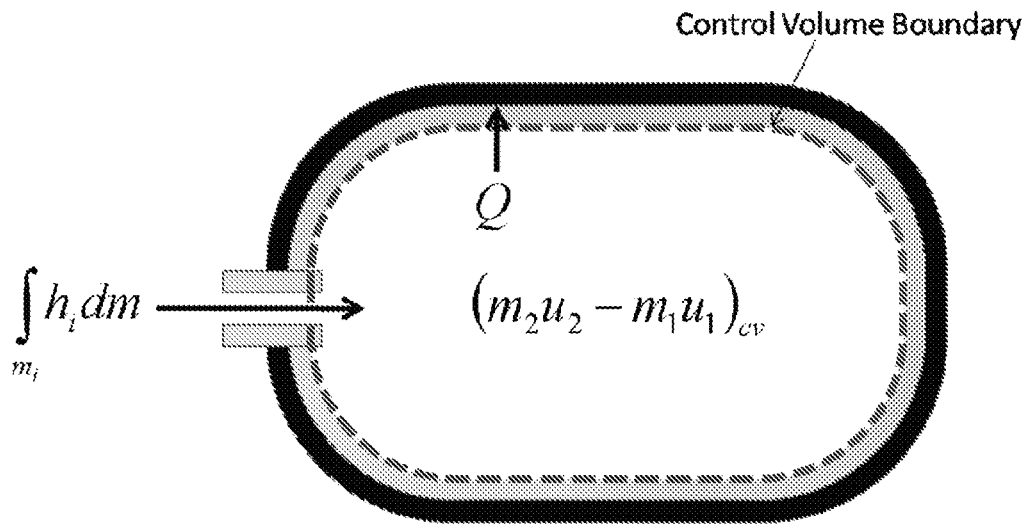
FIG. 1 illustrates the modeling of a hydrogen storage tank during refueling as an open system with an unsteady flow control volume model. For the purpose of this disclosure, the control volume is defined as the boundary between the gas and the liner with heat being transferred through the boundary of the control volume and into the liner of the tank.

In order to provide an accurate prediction of the temperature of the gas, both the amount of energy that has been transferred to the tank and the quantity of heat that has been transferred from the gas to the wall of the tank are estimated. Many studies have been conducted in trying to understand and quantify the end-of-fill temperature. By modeling a hydrogen tank as an open system in unsteady flow, as illustrated in FIG. 1, it is possible to estimate the amount of energy that has been transferred to a tank by measuring the enthalpy of the incoming hydrogen stream and monitoring the temperature of the tank. For the purposes of this disclosure, the control volume is defined as the boundary between the gas and the tank liner with heat being transferred through the boundary of the control volume and into the liner of the tank. The total heat transfer in and out of the system, Q, is reflected in Equations [1] and [2].

$$Q - W = \int_{m_e} h_e dm - \int_{m_i} h_i dm + \Delta E_{system}, \quad [1]$$

and setting $m_e = 0$ and $W = 0$ $$Q = -\int_{m_i} h_i dm + (m_2 u_2 - m_1 u_1)_{cv} \quad [2]$$

where

Q=Total heat transfer in and out of the system (kJ)$_{(Heat\ transfer\ out\ of\ the\ system\ is\ negative\ by\ convention)}$ W=work done to the system (kJ)

$m_e$=mass exiting the system (kg)

$h_e$=enthalpy of the fluid exiting the system (kJ/kg)

$m_i$=mass entering the system (kg)

$h_i$=enthalpy of the fluid entering the system (kJ/kg)

$m_1$=mass of the fluid in the control volume at the initial state (kg)

$m_2$=mass of the fluid in the control volume at the final state (kg)

$u_1$=internal energy of the fluid in the control volume at the final state (kJ/kg)

$u_2$=internal energy of the fluid in the control volume at the initial state (kJ/kg)

cv designates the state of the control volume.

Figure 2:
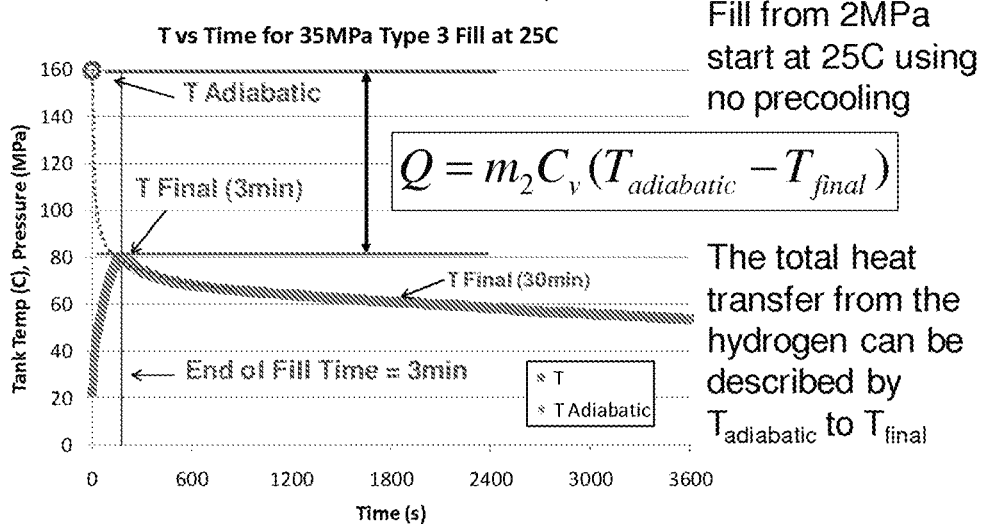
FIG. 2 illustrates a temperature v. time curve for a hydrogen tank refueling procedure, reflecting use of the adiabatic temperature in calculating the heat transfer with the heat transferred from the hydrogen being described by Equation [5] infra.
Figure 3:
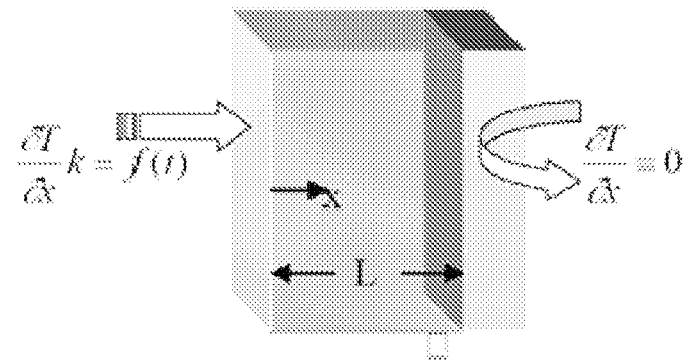
FIG. 3 illustrates a constant heat flux model showing temperature distribution dependent on time with adiabatic boundary condition with a conservative assumption of no heat transfer from the outside of the tank so that the actual final temperature in the tank is expected to be slightly lower than the value calculated in light of this assumption.

The enthalpy can be determined by measuring the temperature and pressure of the hydrogen in the flow stream, preferably at a point close to or at the tank inlet, with the mass flow into the tank being measured or calculated from initial and final conditions. To estimate the final temperature of the gas during or after a refueling procedure, the actual heat transfer, Q, from the gas into the tank wall needs to be estimated. Because Equation [2] only gives information for the internal energy state of the tank a tool, such as the National Institute of Standards and Technology (NIST) Thermophysical Property Database, is used to look up the temperature from the internal energy properties of the target gas, e.g., hydrogen. A curve fit to the NIST data used here for internal energy is illustrated in FIG. 2. The difference between the adiabatic internal energy and the measured internal energy ($u_2$ at measured temp and pressure) is the quantity of heat that is transferred from the control volume, and can be determined from test data.

$$u_{adiabatic} = m_1 u_1 + \int_{m_i} h_i dm \quad [3]$$

$$m_2 = m_1 + \int_{m_i} dm = m_1 + m_i \quad [4]$$

$$Q = m_2(u_{adiabatic} - u_2) \quad [5]$$
$$= m_{cv}(u_{adiabatic} - u_2)$$
$$= m_{cv} C_v (T_{adiabatic} - T_{final})$$

where $u_{adiabatic}$=adiabatic internal energy—if there was no heat transferred from the system (kJ/kg)

$m_2=m_{cv}$=end-of-fill mass of hydrogen in the control volume (kg)

$T_{adiabatic}$=adiabatic temperature—if there was no heat transfer from the system (K)

$T_{final}$=hydrogen temperature at the end of the fill (K)

$C_v$=Specific heat capacity of hydrogen at constant volume (kJ/kgK)

FIG. 2 illustrates a Temperature v. Time curve for a hydrogen tank refueling procedure in which the adiabatic temperature, $T_{adiabatic}$, is used in calculating the heat transfer. The heat transferred from the hydrogen can be described by Equation [5] as detailed above. This provides a tool for analyzing actual test data to determine the amount of heat that has been transferred from the hydrogen gas out of the control volume, or into the structure of the tank. Note that the adiabatic internal energy is based only on initial conditions of the tank (initial mass of hydrogen and initial temperature) and the conditions of the hydrogen delivered from the station (enthalpy and fill mass). There is no dimension of time in the adiabatic condition, and so it is an appropriate reference for results for all time periods. If a reliable method to predict the heat transfer can be found, then it should be possible to directly calculate the final state of the hydrogen in the tank.

To calculate the end-of-fill gas temperature ($T_{final}$), it is necessary to estimate the amount of heat that is absorbed by the tank wall. One method of calculating the total heat transfer is to integrate the temperature distribution over the tank volume at the end of a vehicle refueling procedure. In 2003, General Dynamics conducted a series of tests aimed at understanding the relationship between final tank temperature and filling time with the results being reported in Eihusen, J. A., "Application of Plastic-Lined Composite Pressure Vessels For Hydrogen Storage," World Hydrogen Energy Conference, 2004 (Eihusen), the disclosure of which is incorporated herein by reference, in its entirety. As detailed in Eihusen, a series of filling tests were conducted while measuring the temperature of the gas and of various locations in the hydrogen tank wall.

Figure 4:
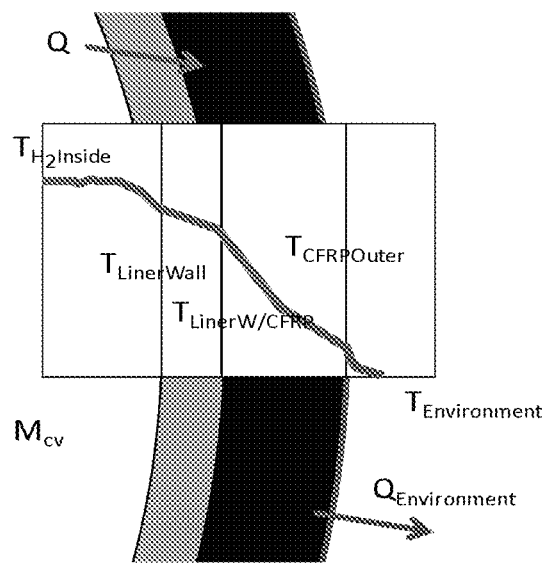
FIG. 4 illustrates a temperature distribution of a section of a composite tank immediately after a vehicle refueling.

These results indicated that during a refueling operation, the heat transfer process was a process in which the temperature of the outer surface of the tank did not rise, indicating that no appreciable quantity of heat was being transferred through the tank wall. Based on these results, General Dynamics proposed a heat transfer model for predicting the temperature distribution within the tank wall which was based on a Green's Function solution to the general heat equation with a constant heat flux on the inside surface and an adiabatic boundary on the outside surface. See Equation [6]. A constant heat flux model showing temperature distribution dependent on time with an adiabatic boundary condition is illustrated in FIG. 4. Note that the assumption of no heat transfer from the outside of the tank is conservative, meaning that the actual final temperature in the tank will tend to be somewhat lower than the final temperature calculated using this assumption.

$$T(x,t) = \quad [6]$$
$$\frac{q_0 L}{k}\left\{\frac{\alpha t}{L^2} + \frac{1}{2}\left(\frac{x}{L}\right)^2 - \frac{x}{L} + \frac{1}{3} - \frac{2}{\pi^2}\sum_{m=1}^{100}\frac{1}{m^2}\left[\cos\left(m\pi\frac{x}{L}\right)\right]e^{-m^2\pi^2\frac{\alpha t}{L^2}}\right\} + T_0$$

where

T(x,t)=Temperature at liner depth=x, time=t $q_0$=Normalized heat flux of the liner (determined from testing)

L=Thickness of the liner k=Thermal conductivity of the liner

α=Thermal diffusivity of the liner $T_0$=Initial temperature of the liner

Inherent in this approach is the assumption that given an initial set of conditions (hydrogen tank temperature, fuel gas temperature and pressure) the fueling temperature result and the temperature distribution result is purely dependent on time. The amount of heat transferred to the liner during a refueling procedure could be estimated by integrating the temperature distribution over the volume of the liner. General Dynamics found that for the given set of tests, this model predicted the final tank temperature within 3K. The assumption of a constant heat flux (or of temperature dependence only on time) is, however, both interesting and problematic. Different initial conditions (temperature of the tank, initial fill mass of the tank, temperature and/or pressure of the incoming gas) will produce different temperature gradients, and hence a different average heat flux. Further, the heat flux would depend on the conditions of the boundary layer between the gas and the wall—a change in the velocity, density, or temperature of gas flow over the wall resulting from forced and/or free convection inside the tank would result in a corresponding change in the heat transfer. As these conditions do tend to vary during the actual tank filling procedure, the heat flux will also tend to vary over the course of the filling procedure.

Furthermore, hydrogen refueling tests by the Japan Automobile Research Institute (JARI) as reported in Hirotani, R., et al., JARI, "Thermal Behavior in Hydrogen Storage Tank for Fuel Cell Vehicle on Fast Filling," World Hydrogen Energy Conference, 2006, the disclosure of which is incorporated herein by reference, in its entirety, revealed a significant temperature distribution within the gas itself, up to a 30K difference throughout the tank, which would influence the heat flux. The presence of such temperature distributions further complicates the analysis of data as well because it renders it difficult, if not impossible, to know precisely how accurately a particular temperature measurement taken inside the tank represents the bulk properties of the tank.

Relative to the bulk temperature, if the thermocouple is measuring a temperature that is warmer or cooler than the average bulk temperature, the calculated values will obviously be less accurate. Although it is customary to assume that temperature measurements taken at or near the centerline of the tank will represent the average (bulk) gas temperature, the magnitude of the error(s) associated with this assumption are unknown in practice. Data taken during the development of the method and system disclosed herein reflected show unexplained errors of ±5K between the thermocouple output and the expected bulk gas temperature. Modeling efforts by the SAE TIR J2601 committee similarly reflected errors of up to 9K between the modeled temperature and the measured data despite the use of thermocouples that have an accuracy of approximately ±1K. These real world complications to the temperature gradient modeling make it difficult in practice to apply a heat transfer model for directly estimating the temperature distribution in order to calculate the end-of-fill temperature (with reliance on one or more temperature signal(s) during communication fueling operations introducing a degree of uncertainty).

One objective of the JARI testing was to analyze the impact of utilizing different refueling patterns while still keeping the same overall fueling time. An interesting result of the JARI testing indicated that, given the same initial conditions and a set filling time, the temperature of the gas at the end-of-filling is similar, regardless of the particular filling pattern used in conducting the filling operation.

Analysis presented by St. Croix Research to the SAE TIR J2601 Committee, Powars, C., "70-MPa Hydrogen Tank Filling Model and Test Data Observations—SAE TIR J2601 Modeling Sub-Team Meeting, Sep. 15, 2008," St Croix Research, 2008, the disclosure of which is incorporated herein by reference, in its entirety, also shows that the outer tank temperature does not rise significantly during a vehicle refueling.

While complex heat transfer models and analysis were previously proposed to explain the results of these tests, the innovative approach described herein is based on analyzing tank refueling processes using a simple lumped heat capacity model, the development of which is described in more detail below and further illustrated in the associated figures. The utility and applicability of this novel solution can be confirmed by using the JARI, General Dynamics, SAE and St. Croix Research results to show that the simplified model based on lumped heat capacitance detailed herein models and predicts the heat transfer characteristics of the system with sufficient accuracy. Additional testing and analysis of fueling data was conducted and the results further verified that this new method of using this lumped heat capacitance model is sufficient for accurately describing the thermodynamics of hydrogen tank refueling systems and improving the associated refueling processes.

Figure 5:
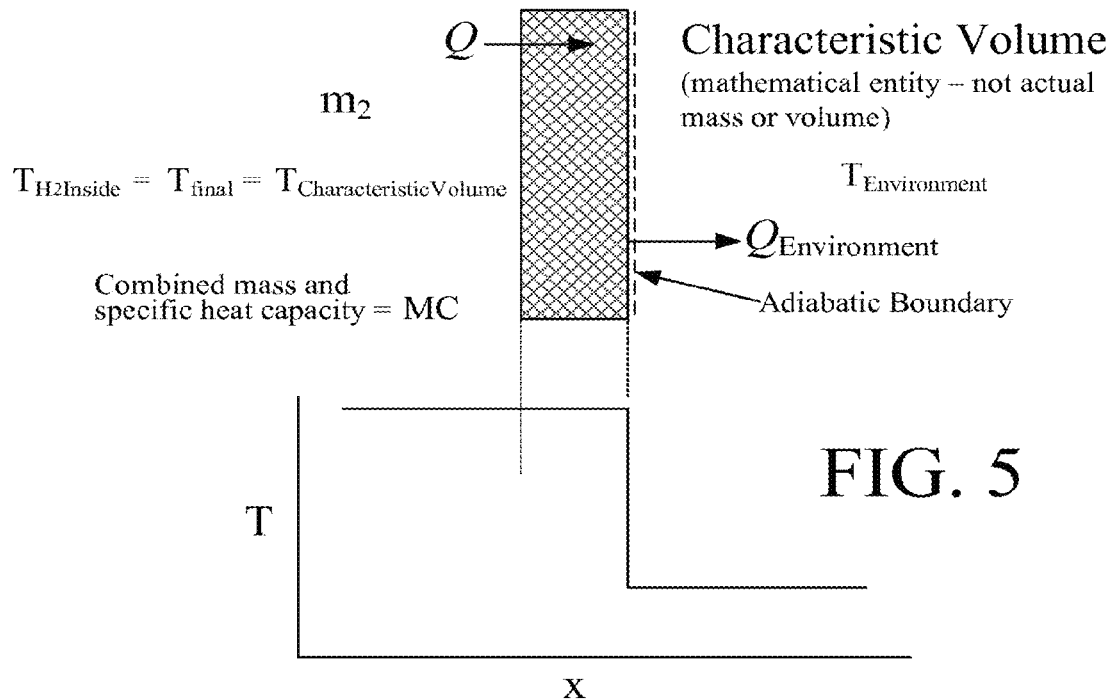
FIG. 5 illustrates a simplified representation of a hydrogen tank having an imaginary characteristic volume of combined mass and specific heat capacity MC, with adiabatic external boundary.

Consider a tank that has just completed a vehicle refueling in a short period of time. As illustrated in FIG. 5, the inside of the tank is much hotter than the outside of the tank, due to the conversion of pressure energy to sensible energy of the high pressure hydrogen that was just recently injected into the tank. Calculating the actual temperature distribution is difficult because 1) there is a temperature distribution between the hydrogen in the tank and the liner due to boundary conditions, 2) there is a temperature distribution through the liner, contact resistances between layers, 3) there is a temperature distribution through the various layers of the tank and 4) there is a temperature distribution between the outside of the tank and the environment due to the outer boundary conditions. And as discussed previously, there may also be a temperature distribution within the hydrogen in the tank itself on the order of 30K. Each layer has a different specific heat capacity that might also be dependent on temperature, and each layer is composed of a different mass. Given all of these complexities, it is exceedingly difficult, if not impossible, to calculate the precise temperature distributions through the wall of the tank.

The biggest difficulty in considering a heat transfer model based on a precise calculation of the temperature distribution in the wall of a hydrogen tank is that it requires a solution to the temperature distribution for the entire time domain of a refueling event, a solution which is difficult to achieve in practice. Accordingly, the method utilizes a combined mass and specific heat capacitance model, as shown in FIG. 5, which illustrates a simplified section of a tank wall having an imaginary characteristic volume defined by its mass (M) and specific heat capacity (C) and an adiabatic external boundary. The temperature of the characteristic volume will be the same as the temperature of the gas, for example, hydrogen.

This section of the tank wall, the characteristic volume, will have a combined mass and specific heat capacity, MC (kJ/K). Note that the characteristic volume and the associated MC are mathematical constructions only. Given knowledge of a tank design and the materials used in the tank construction, it is possible to provide a reasonable estimation of the MC value. In the method disclosed herein, however, there is no need to calculate the exact mass and specific heat capacity of the tank because the characteristic volume simply acts as a heat sink, allowing its characteristics to be used in predicting the thermal behavior of the tank system.

In applying the method the temperature of the characteristic volume is set to be equal to the temperature of the hydrogen in the tank at the end of the vehicle fill. This means that the characteristic volume has both high thermal conductivity and high convective heat transfer coefficient. In addition, $Q_{Environment}=0$, meaning that no heat is transferred out of the characteristic volume during the fueling (adiabatic boundary). As discussed supra, there is very little heat transfer to the environment during the refueling operation, allowing this component of the heat transfer to be ignored. In an illustrative example, the heat transfer equation is solved for the target or preferred end-of-fill condition of, for example, a fill time of 2 or 3 minutes, plus some adjustment for longer fill times as deemed necessary. For the purposes of this disclosure, a target fill time of 3 minutes has been used, but those skilled in the art will appreciate that the method can be easily utilized for longer or shorter fill times.

When applying a characteristic volume in this manner, the heat that is transferred from the hydrogen mass, $m_{cv}$, into the characteristic volume can be described by the temperature rise during the fueling of the characteristic volume with a combined mass and specific heat capacity of MC.

$$Q = MC(T_{final} - T_{initial}) \quad [7]$$

where
MC=Combined Mass and Specific Heat Capacity of the Characteristic Volume (kJ/K)
$T_{final}$=Temperature at the finish of the refueling (K)=
$T_{initial}$=Temperature at the beginning of the refueling (K)
By applying an energy balance across the boundary of the control volume, and combining equation [5] (energy transferred from the hydrogen) with equation [7] (energy transferred to the characteristic volume) results in:

$$Q = m_{cv}(u_{adiabatic} - u_{final}) \text{ energy} \quad [5]$$
transferred from the hydrogen control volume $$Q = MC(T_{final} - T_{init}) \text{ energy transferred to the characteristic volume} \quad [7]$$

$$MC = \frac{m_{cv}(u_{adiabatic} - u_{final})}{(T_{final} - T_{init})} \quad [8]$$

Figure 6:
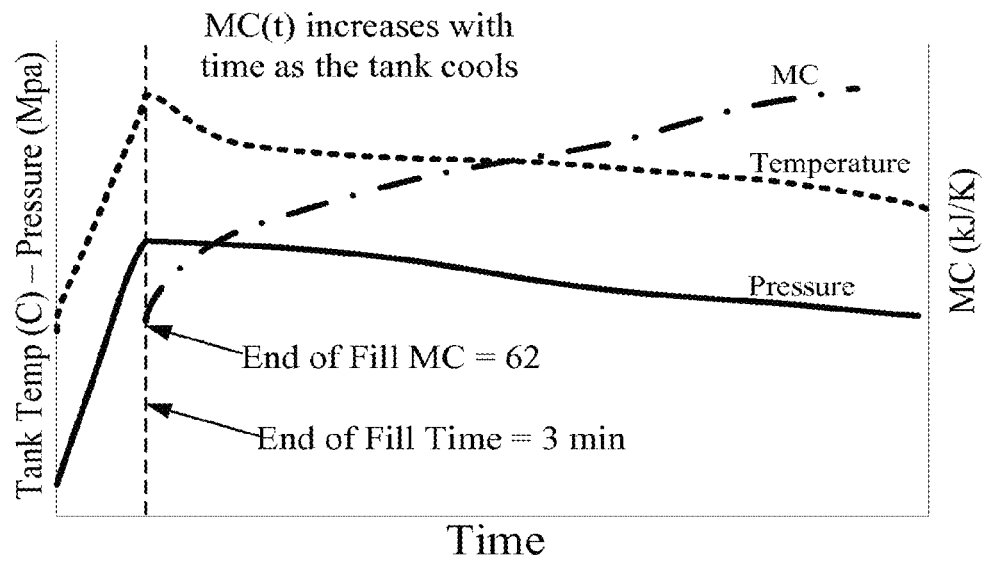
FIG. 6 illustrates a typical vehicle fill in 3 minutes with a Type 3 tank that produces an end-of-fill MC value of 62 that then tends to increase as the tank cools. This trend of MC v. time is characteristic for a given tank system, and can be used in predicting the temperature result of longer vehicle fueling times.

MC can then be determined directly from test data for a particular refueling procedure by using Equation [8], which is the ratio of the heat transferred from the hydrogen to the temperature change of the characteristic volume. For Equations [7] and [8], $T_{init}=T_{initial}$. The temperature, pressure and MC behavior associated with a 3-minute fill of a Type 3 tank is illustrated in FIG. 6. As reflected in the graph, the MC is 62 at the end-of-fill point, but then increases over time as the tank cools. This trend of MC over time can, in turn, be used in predicting the result of longer filling procedures. Once an MC is known for a given set of initial conditions, it can be used for directly calculating the final temperature of refueling event.

$$Q = m_{cv}(u_{adiaatic} - u_{final}) \quad [5]$$

$$Q = m_{cv}C_v(T_{adiabatic} - T_{final}), \text{ another identity of equation 5} \quad [9]$$

$$Q = MC(F_{final} - T_{init}) \quad [7]$$

Combining equations [9] and [7] we get:

$$T_{final} = \frac{m_{cv}C_vT_{adiabatic} + MCT_{init}}{MC + m_{cv}C_v}, \quad [10]$$

combining equations [7] and [9]

where
$C_v$=specific heat capacity of hydrogen at constant volume, kJ/(kgK)

Equation [10] can then be used to calculate the expected final temperature of a hydrogen tank refueling just as a fill has started. The MC parameter and $m_{cv}$ (the end-of-fill mass in the control volume) are transmitted to the station. In a nonlimiting example, the MC parameter and $m_{cv}$ are transmitted by RFID, through the SAE TIR J2799 IRDA interface, or via an identification number that corresponds to entries in a database that is readily accessible to the hydrogen tank filling station. The hydrogen tank filling station can calculate $T_{adiabatic}$ from $m_{cv}$ and parameters including 1) the initial pressure of the tank receiving the hydrogen (e.g., the vehicle's tank), 2) the initial temperature of the tank receiving the hydrogen (assuming ambient conditions plus some differences due to the possibility of a hot or cold tank as discussed in SAE TIR J2601) and 3) the enthalpy of the delivered hydrogen, which is a function of the expected average temperature and pressure of the delivered hydrogen (further description is given in the Appendix provided in FIG. 24).

Certain characteristics of the MC Method make it particularly useful for gas delivery systems. For example, a particular tank configuration will have a characteristic curve of MC v. fill time from which adjustments can be made to compensate for a range of initial conditions. Utilizing the MC model avoids the need to address all of the intricacies of the temperature distribution of the wall of the tank, especially over a time scale associated with typical hydrogen tank refueling procedures, e.g., two to three minutes or more.

MC is not a direct physical constant such as the mass and the specific heat capacity of the tank and liner material but is rather it is a composite value, similar to an overall heat transfer coefficient, that encompasses heat transferred to tank valve assemblies and piping as well as heat transferred to the hydrogen comprising the initial gas volume inside the tank being filled. Systems with slower heat transfer characteristics (convection or conduction) will tend to result in lower values of MC (such as Type 4 tanks) while systems with faster heat transfer characteristics (convection or conduction) will tend to result in higher values of MC (such as Type 3 tanks). Although MC is a function of a number of different parameters including, for example, time, fill conditions, tank materials, tank configuration, etc., for a given tank, fill time and set of fill conditions, MC will be constant. The trend in the MC value over both time and under different fill conditions can be predicted and, in turn, utilized for adjusting the hydrogen tank filling procedures to improve efficiency while maintaining desired safety margins.

Based on observations of several sets of test data coupled with the use of multiple linear regression for evaluating the significance of various parameters, many possible physical models were considered for describing the MC v. time curve and also describing the changes in initial conditions that were tested. In a non-limiting example, one model is represented by Equation [11], as shown below:

$$MC(U, t) = C + A\ln\left(\sqrt{\frac{U_{adiabatic}}{U_{initial}}}\right) + g(1 - e^{-k\Delta t})^j \quad [11]$$

or, in an alternative non-limiting example, Equation [11]', as shown below:

$$MC(U, t) = C + A\left(\frac{U_{adiabatic}}{U_{initial}}\right) + g(1 - e^{-k\Delta t})^j \quad [11]'$$

where C, A, g, k and j are constants derived from characterization testing $U_{adiabatic}$ is the adiabatic internal energy=$m_{cv}u_{adiabatic}$ $U_{initial}$ is the initial energy=$m_{initial}u_{initial}$ $\Delta t$ is the difference in time between the normally defined end-of-fill time (e.g., 3 minutes) and the end-of-fill time that achieves the desired final temperature.

In the context of Equation [11], C is a constant that represents a minimum heat capacity of, for example, a 2- or 3-minute fill, A is a constant representing an adjustment to the MC corresponding to the initial fill conditions and pre-cooling amount and constants g, k, and j are, if necessary, utilized within the MC Method to provide the ability to adjust the resulting MC by extending the fill time beyond 2 or 3 minutes, so that $T_{final}$ can be optimized around a desired temperature. However, it is to be understood that those skilled in the art will appreciate that there are many possible models that can be developed to predict the trend of MC with time, internal energy, pre-cooling temperature, etc. The MC Method is not intended to, and does not attempt to, perfectly describe the physics but instead provides an analytical engineering tool that can be used for predicting the temperature outcome of a particular filling procedure by approximating the equivalent heat mass of the system.

Figures 7, 8:
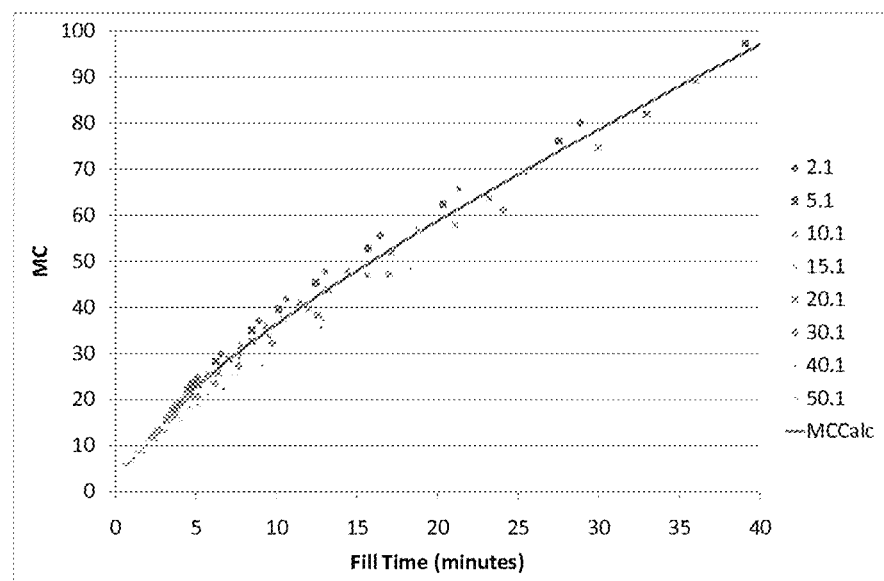
FIG. 7 illustrates MC v. fill time for a "default" SAE TIR J2601-70 MPa Type 4 tank. This graph is derived from the Type B (7-10 kg) 70 MPa station tables of SAE TIR J2601.
FIG. 8 illustrates a potential Test Matrix for tank characterization

One way to check a new model is to verify that the model is capable of describing or predicting phenomena documented in previous literature. The Society of Automotive Engineers (SAE) conducted several sets of hydrogen tank fill testing at Powertech during the development of SAE TIR J2601, in support of, and to test the modeling efforts that were being conducted to build the refueling tables in SAE TIR J2601. By using the tables provided in SAE TIR J2601 as a set of test fills and plotting the MC of each fill versus the fill time using Equation [8], the results fall in a distinct pattern as illustrated in FIG. 7.

This result is encouraging for several reasons, including but not limited to 1) because the MC Method describes the actual results of the SAE TIR J2601 tests quite well, suggesting that the model accurately represents the physics of hydrogen tank filling, and 2) because the entire set of tables in SAE TIR J2601 can be approximated using this single equation. This result indicates that the equation utilized in the MC Method can be used to describe the MC v. Time over a wide range of conditions, and can be used in place of the several sets of tables defined in SAE TIR J2601, which require interpolation between the listed data to find the appropriate pressure ramp rate and end of fill pressure target. Because the MC Method can adjust the fill time to match a desired final tank temperature, it can be used for any station configuration. This releases the fill protocol from reliance on the rigid "Type A, B, C, D" station type designations of SAE TIR J2601, because the resulting fill temperatures can be derived for a wide range of station conditions. Indeed, by using the coefficients of the MC v. time curve utilized in the MC Method, a hydrogen tank filling station can directly calculate the expected end-of-fill temperature ($T_{final}$) using Equation [10].

As will be appreciated by those skilled in the art, using the SAE TIR J2601 tables to calculate a characteristic MC curve provides a characteristic curve that corresponds to a "default SAE TIR J2601 tank." Accordingly, when this MC curve is used in Equation [10], the fill results are substantially the same as those represented in the SAE TIR J2601 tables. The MC Method, however, is intended to provide for fill times that are both shorter than predicted from the SAE TIR J2601 tables and provide for improved fill quality. In order to achieve this result, the MC Method incorporates the specific characterized MC curve corresponding to a specific tank.

A set of fill tests were conducted at Powertech during Feb. 1-6, 2010 and Aug. 23-30, 2010 in order to characterize a 171L Type 3—35 MPa tank, an approximately 109L Type 4—70 MPa tank, and the same Type 4—70 MPa tank filled to 50 MPa, and a 34L Type 3—70 MPa tank. Each tank was tested using pre-cooled and non-pre-cooled gas, at 25° C. ambient, and 2 MPa starting pressure or ½ tank starting pressure. Each tank was filled in approximately 1 to 3 minutes at the given conditions and data recorded for 1 hour following. Each tank was then defueled and allowed to soak at the ambient temperature until the next test the following day.

Figure 9A:
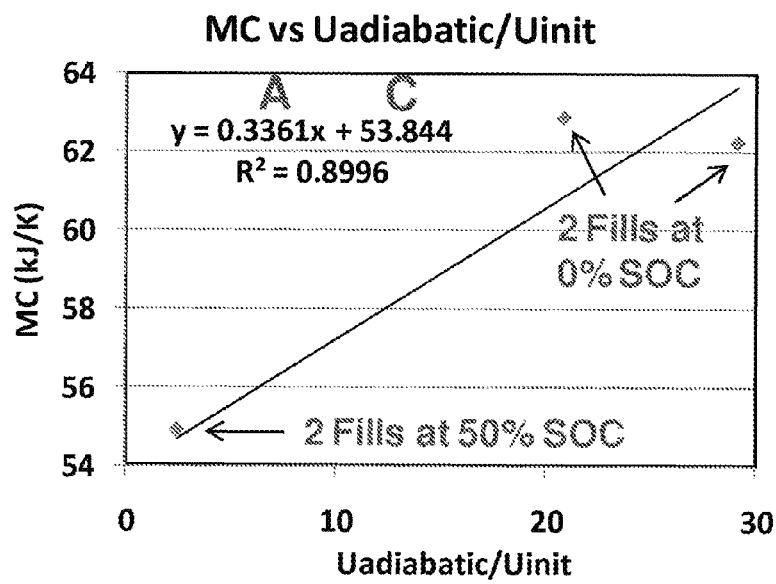
FIGS. 9A and 9B illustrate MC v. $U_{adiabatic}/U_{init}$ for fills of a Type 3 tank from which the coefficients A and C can be determined for both longer fill times, using a linear approximation, and shorter fill times, using a logarithmic approximation.
Figure 9B:
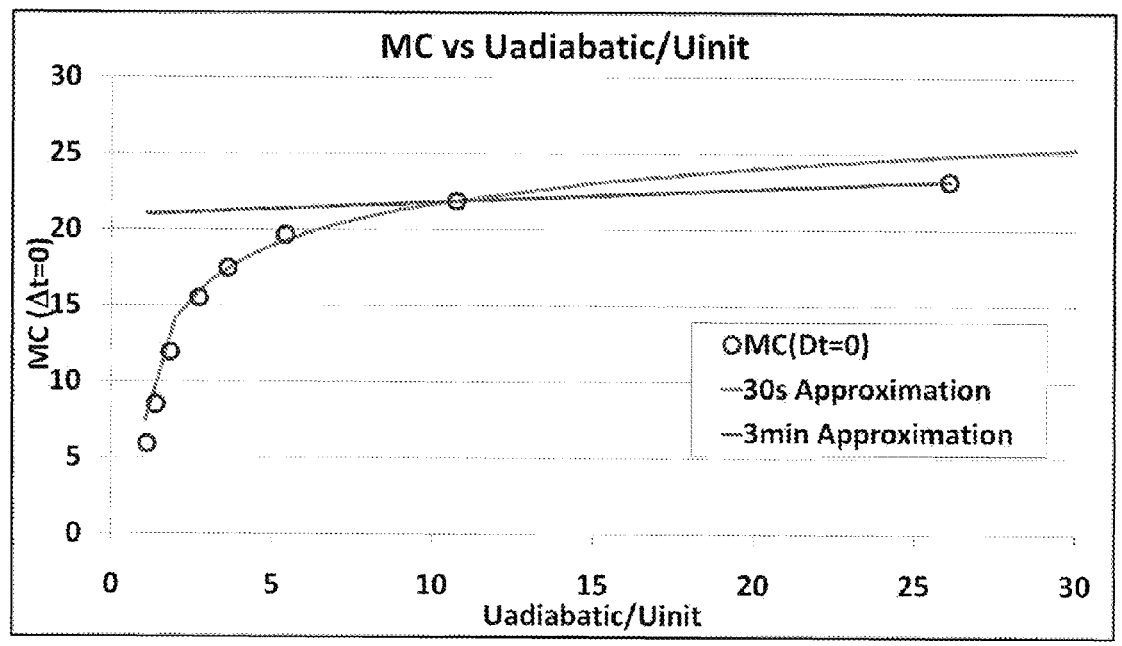
Figure 10:
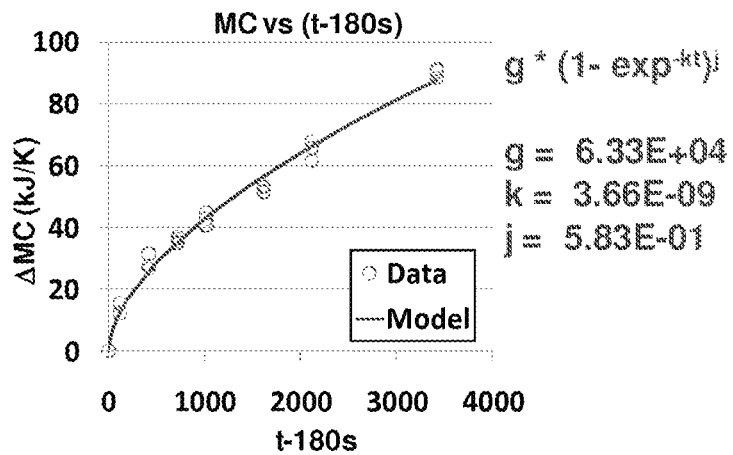
FIG. 10 illustrates ΔMC v. time for fill times having a duration of more than 3 minutes from which the coefficients g, k, and j can be determined for describing the behavior of MC for fill times in excess of 3 minutes.

Using Equation [8], the MC v. time was plotted for each fill, as shown in FIG. 6. All of the tank fills follow a similar pattern of MC v. Fill Time as shown in FIG. 7. The resulting curve corresponds to the tank characteristic(s) for a given tank under a given set of conditions. To find the coefficients used in Equation [11], the MC for each end-of-fill at 3 minutes was plotted against the adiabatic internal energy divided by the initial internal energy, as shown in FIG. 9. The slope and intercept of the linear best fit line give the coefficient A and the constant C respectively. The $\Delta$MC v. $\Delta$time, that is $(MC_{(t-180s)} - MC_{(180s)})$ v. (t−180 s), is then plotted as shown in FIG. 10, and a best fit model is used to determine the coefficients g, k and j. These coefficients can then be used to describe how much heat is absorbed by the tank in the time beyond the typical fill time and are particularly useful under conditions in which the ambient temperature is too warm and/or the pre-cooling temperature is too warm to achieve an end-of-fill temperature of less than 85° C. with a refueling time of 3 minutes or less.

Figure 11:
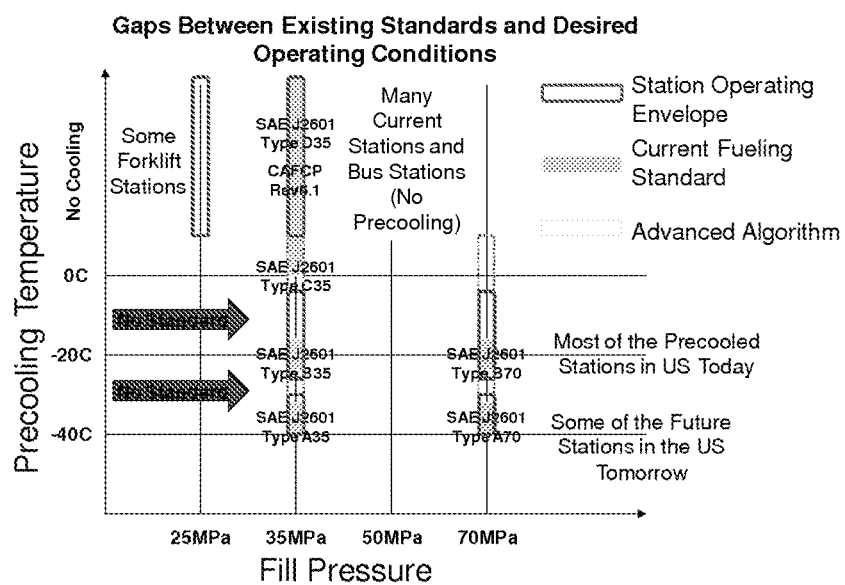
FIG. 11 illustrates a comparison of the hydrogen station operating envelopes to the existing refueling standards, showing several gaps in the coverage of existing or anticipated operating regimes.

To use the MC parameters for improving the performance of a hydrogen tank filling station, a fueling protocol needed be developed. A fueling protocol should provide safe, high state of charge (SOC) fills, for a broad range of ambient conditions and initial fill conditions. Comparing the current fueling standards with the actual operating ranges of existing hydrogen stations, as illustrated in FIG. 11, it is clear that the current refueling standards do not satisfy a broad range of station fuel delivery operating conditions. Further, should a vehicle manufacturer or modifier introduce a tank designed to operate at another pressure of, for example, 50 MPa, the fueling standard(s) would have to be rewritten to accommodate this modification.

In order to fully utilize the MC Method at an actual fueling station, the MC parameters must be communicated to or determined by the station in some manner. This data collection could be achieved in a number of ways. In a non-limiting example, RFID, or even the IRDA interface defined in SAE J2799, may be used to transmit the MC parameters from the vehicle to the station. There is a working group within the California Fuel Cell Partnership that is developing a Hydrogen Vehicle Authorization System (HVAS) to be used for confirming that a vehicle is authorized to fuel (OEM vehicle or a conversion that meets safety requirements). The HVAS specifications and device are still under development but it is a candidate for communicating the MC parameters to the station, either directly through the device or, alternatively, by matching the identified vehicle to a database from which these parameters could be retrieved.

Figure 12:
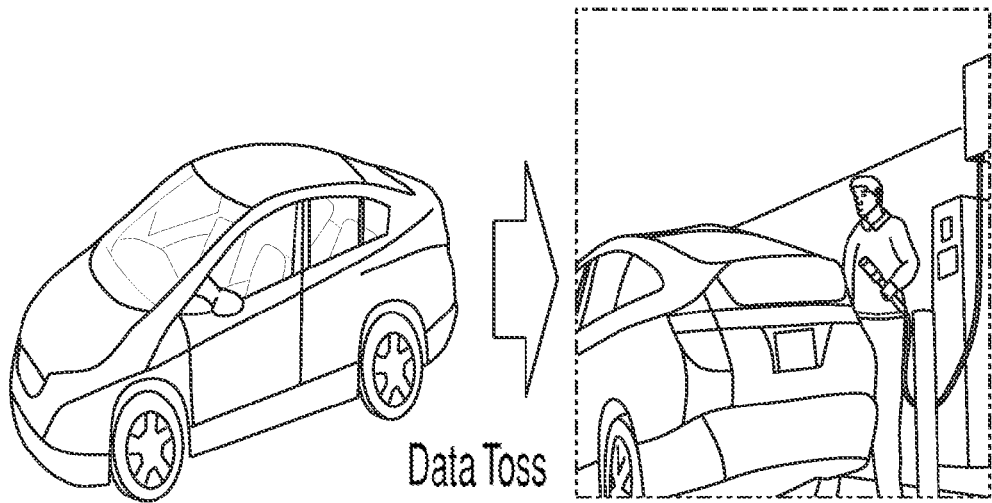
FIG. 12 illustrates information required for fully utilizing the MC Method for determining a fueling protocol under a given set of conditions.

FIG. 12 shows both the vehicle side and station side information that may be used to fuel a vehicle based on the MC Method. The station will have access to both the vehicle side information through, for example, HVAS and station side information through direct measurement. The process the station goes through to determine the appropriate fueling speed and end-of-fill pressure target is very similar to that used in building the lookup tables in SAE TIR J2601. The difference is that the assumptions utilized in J2601 are worst case, and based on boundary condition tanks, whereas in conjunction with the MC Method, the station is given some basic parametric data and tailored assumptions for filling the particular vehicle.

The MC Method can also readily accommodate the communication of specific modification to the fill protocol preferred or specified by the OEM. For example, if an OEM imposes or suggests a maximum fill rate, develops a tank system in which the maximum temperature can exceed 85° C. or allows fueling to 103% SOC (if inside of the Maximum Allowable Working Pressure (MAWP)), parameters related to the OEM's design or operating limits and/or preferences can be provided to the hydrogen tank fueling station for modifying the fill protocol accordingly. This flexibility puts additional control of the outcome of the vehicle refueling squarely into the hands of the OEM, so that fill stations utilizing the MC Method can adapt the fill protocol to accommodate the particular vehicle and thereby permit a broader range of OEM designs.

In an embodiment, when applying the MC Method, the fueling process can comprise two discrete steps. In the first step, parametric data is used to determine an appropriate fueling fill rate, i.e., one that will not overheat the gas in the tank. During the second step, the fueling fill rate is used to determine a target end-of-fill pressure that will keep the system pressure within the target pressure ranges. These two steps are explained below in more detail.

In order to determine the appropriate fueling rate for the projected fill operation, the hydrogen tank filling station takes into consideration both the capabilities of the vehicle tank system and its own capabilities to deliver the fuel under the current conditions.

The limits of refueling, as defined in SAE TIR J2601 and TIR J2579 are 85° C. and 125% of the NWP for average gas temperature and pressure, respectively. In an illustrative example, the station makes an assumption about the average gas temperature inside the tank, based on measuring the ambient air temperature and optionally adding a margin for a hot soak condition (e.g., the vehicle has been parked in an environment that is hotter than ambient, such as a hot garage or parking lot). The station also determines the approximate initial SOC of the vehicle, using the temperature assumption and by dispensing a small amount of fuel to the tank to equilibrate the hose pressure to the tank pressure. Based on the tank pressure and vehicle side information, the station can estimate how much hydrogen (mass) must be delivered to the vehicle to achieve the desired SOC and, utilizing an estimate of its pre-cooling capability, the station can calculate the average enthalpy that will be delivered to the vehicle's tank system during the fill operation. Working from this information, the station can then determine how quickly to fill the vehicle while maintaining the requisite safety margin.

Figure 13:
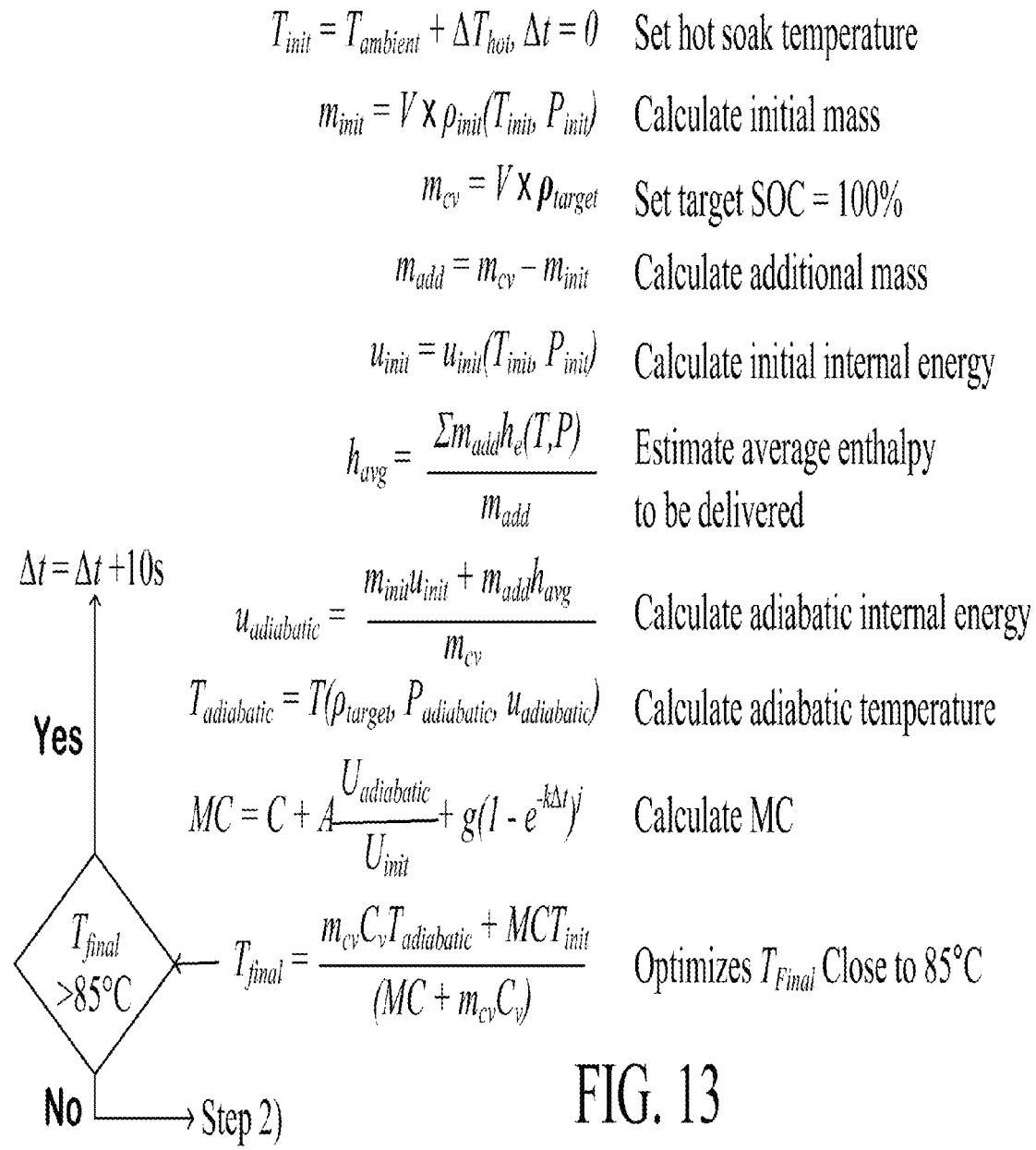
FIG. 13 illustrates the MC Method first step—determining the fueling time based on a higher than ambient temperature soak condition.

As explained supra, the primary MC parameter is based on a target fueling time with additional parameters being used to account for the initial SOC and/or fueling times that exceed the target fueling time. Starting with these targets, the station analyses an initial fill protocol to determine if the fill can be successfully completed, i.e., end-of-fill temperature within specification. If it is determined that the initial fill protocol cannot be successfully completed, an iterative process is initiated to determine an appropriate fueling time. For example, if the fueling operation can be conducted in the target time without exceeding any temperature limits, the station will initiate fueling. If, however, the initial fill protocol would cause a temperature limit to be exceeded, the projected fueling time will be increased by some increment (e.g., 0.1, 1, 5, 10 seconds, etc.) and the new MC value will be calculated. This incremental increase of the fueling time will continue until a fueling time is identified that will result in end-of-fill conditions that are within specification, e.g., the end-of-fill gas temperature is less than 85° C. This process is shown in FIG. 13. The output of this Step 1 is the $T_{final(Hot\ Soak\ Bound)}$ and the fueling or fill time. In an embodiment, the appropriate fueling time can be continuously calculated throughout the fill procedure based on the actual enthalpy delivered to the vehicle. Accordingly, even though the fueling time calculated at the beginning of the fill should be a good approximation, the fueling time (or rate of pressure rise during the fill) can be adjusted as necessary utilizing a feedback loop based on the actual fill conditions as they occur.

For the dispenser to make the assumption that the upper bound of gas temperature inside the tank is ambient T plus a ΔT hot soak, it must know that the vehicle has not been refueled in the recent past. If it cannot know this information, then it should make a more conservative assumption, and determine the fueling speed based on an empty or nearly empty tank. Then, even if the vehicle was recently refueled, the fueling speed will not overheat the tank.

If the recent fueling history of the vehicle can be determined, a less conservative fueling speed can be utilized, potentially shortening the fueling time considerably. There are a number of approaches that can be utilized for determining the recent fueling history of the vehicle. A non-limiting example is for the HVAS RFID tag to be time stamped each time the vehicle is fueled. The dispenser can then read this time stamp each time the vehicle is fueled and determine whether to use a conservative fueling speed if the time stamp indicates a recent refueling, or a less conservative fueling speed based on the actual starting pressure in the tank if the time stamp indicates refueling has not occurred recently.

Once the appropriate fueling time has been determined, the next step of the MC Method is to determine when, or at what pressure, to stop the fill operation. The process used by the station in this second step is similar to that used in the first step except that the station assumes the gas temperature inside the tank at the beginning of the fill is below the ambient temperature, i.e., a cold soak condition, which includes the possibility that the tank has been soaked in an air conditioned garage, or that the ambient temperature is rising and the internal gas temperature lags the ambient. There is also the factor of driving that may be considered in which the gas temperature inside the tank has been reduced as a result of the decrease in pressure as the hydrogen was consumed. The MC Method can be used to estimate the average temperature of the MC and hydrogen gas during defueling using Equation [12]

$$u_{adiabatic}(t) = \frac{U(T_{ColdSoak}, P_{NWP}) - m_{add}(t)h_{exit}}{m_{initCold}} \quad [12]$$

where $M_{add}$=mass exiting the hydrogen tank in time t $m_{add}=m_{cv}-m_{initCold}$=mass to be added during the vehicle refueling calculated in the MC Method to achieve 100% SOC $h_{exit}$=average enthalpy of the hydrogen exiting the tank $m_{init\ Cold}$=mass in the tank just before refueling t=time it would take to empty the tank from $P_{NWP}$ to the starting fill pressure $P_{init}$ $$t = \frac{m_{add}}{\dot{m}} \quad [13]$$

where $\dot{m}$=flow rate of hydrogen during defueling (g/s)

$T_{ColdSoak}$=assumed temperature of the vehicle tank before defueling $$T_{ColdSoak} = T_{ambient} - \Delta T_{Cold} \quad [14]$$

And combined with Equation [11] where the $T_{adiabatic}$ is determined by a curve fit to NIST data as before, then $T_{final}$ is the average temperature of the MC and the gas in the tank.

$$T_{FinalDefuelCold} = \frac{m_{CV} C_V T_{AdiabaticCold} + MC(t) T_{ColdSoak}}{MC + m_{CV} C_V} \quad [15]$$

The appropriate $\Delta T_{Cold}$ parameter, and the defueling mass flow rate $\dot{m}$, will typically be determined by the OEM and will be provided as part of the vehicle side information transferred through HVAS or otherwise made available to the filling station.

Once the initial conditions have been determined, the station can calculate how much mass must be added to the tank to reach the target density of 100% SOC. If the station has an accurate flow meter, it can simply integrate the mass flow during the fill and stop when the target mass has been achieved, however, the application of a flowmeter in this capacity might have its own challenges. A second option is to calculate a pressure target utilizing the same set of equations as in Step 1. $T_{final}$ can be calculated based on the fueling time of Step 1, and then the $P_{target}$ value can be calculated based on the pressure that, in conjunction with $T_{final}$, provides a 100% SOC target density.

This process can be more easily understood by utilizing the equations shown in FIG. 14. It is important to note that the pressure target can be continuously calculated throughout the fill procedure based on the actual enthalpy delivered to the vehicle. Accordingly, even though the pressure target calculated at the beginning of the fill should be a very good approximation, the pressure target utilized in stopping the fill can be adjusted as necessary based on the actual fill conditions as they occur. The output of this Step 2 is the $P_{Target}$.

In the case of a fill with communications, the initial temperature can be measured directly by the station. Because this initial temperature is a settled temperature, i.e., a temperature not subject to the dynamic changes associated with vehicle fueling, it is typically reliable. In such cases, the $T_{init}$ is simply the measured initial temperature and the hot soak and cold soak assumptions detailed above need not be considered.

During the fill testing conducted during development of the MC Method, a "Target $T_{final}$" value was calculated in order to evaluate any errors between the expected result and the actual result. This "Target $T_{final}$" is shown in FIGS. 16-18 and FIG. 20 to demonstrate the accuracy of the MC Method. In a normal "ID-Fill," Step 3 is unnecessary—the station does not need to calculate an expected result as the fill protocol is fully defined by Step 1 and Step 2.

Using the fill rate from Step 1, and the Pressure Target from Step 2, the expected $T_{final}$ can be calculated. Because the Pressure Target calculated in Step 2 is usually lower than the Pressure Target that was assumed in Step 1, the resulting fill will tend to exhibit a slightly lower SOC % which, in turn, indicates that the gas density target needs to be reduced to match the Pressure Target at a higher $T_{final}$ than was calculated in Step 2. Because a change in additional mass of hydrogen added affects the $T_{adiabatic}$, for greater precision it is necessary to complete the outlined calculations in order to determine the expected $T_{final}$ and SOC % target.

As will be appreciated by those skilled in the art, the utility and flexibility of the MC Method provides many opportunities for customization and refinement to encompass, for example, fueling times of less than 3 minutes for tanks that start filling at high SOC.

To confirm the MC parameters calculated according to the procedures defined supra, and to confirm the accuracy of using these parameters in the filling algorithm detailed supra, a fifth fueling test was conducted for each of the previously tested tanks using conditions of ambient temperature, initial fill amount, and pre-cooling temperature that were different than the conditions used in characterizing the tank. Using the algorithms discussed supra and illustrated in FIG. 13, the expected final temperature $T_{final}$ was calculated for fills conducted at 35 MPa, 50 MPa and 70 MPa. For the Hot Soak margin of safety to overheat, $T_{init}$=Ambient Temp+7.5° C. was used, for the Cold Soak margin of safety to overfill, $T_{init}$=Ambient Temp −10° C. was used. For the target $T_{final}$, $T_{init}$=Ambient Temp was used in the algorithm illustrated in FIG. 15.

The results of a 35 MPa Type 3 Tank Confirmation Test are illustrated in FIG. 16. Although the original targets were set for delivering 0° C. gas, the hydrogen filling station being used for the evaluation was actually delivering nearly 5° C. gas, which would be outside of the SAE TIR J2601 tolerance of 0° C.±2.5° C. for a Type C station. This demonstrates one of the practical challenges of defining a tight tolerance on the pre-cooling temperature—it is actually difficult to achieve and/or maintain, even in test conditions. In light of the noted capabilities of the hydrogen filling station, the targets were adjusted for using 4.8° C. as the temperature of the delivered gas, the 35 MPa tank fill actual temperature measurement was within 1K of the calculated $T_{final}$. Further, although fill completion was targeted for 180 seconds, the actual fill was finished at 196 seconds. As a practical measure, in order to achieve an optimum fill time the Hot Soak Bound should be set at 85° C., however, because the test was predicated on a 3-minute fill target, the Hot Soak Bound is less than 85° C. The MC Method algorithm can be further refined to improve performance for fill times of less than 3 minutes.

The results of a 70 MPa Type 4 Tank Filled to 50 MPa Confirmation Test are illustrated in FIG. 17. In this instance, although the pre-cooler was set for −20° C., it was determined that the pre-cooler was actually delivering −14.8° C. gas on average. This result once again reflects the actual difficulty of meeting SAE TIR J2601 tolerances of −20° C.+/−2.5° C. for a Type B station. In light of the observed performance, the temperature targets were adjusted to reflect what −15° C. pre-cooling targets would have been, given the same conditions otherwise. Although this rendered the Hot Soak bound high at 89° C., this deviation is a relic of the pre-cooling temperature being out of specification.

Also noted were changes in temperature in the tank measured after the end-of-fill. These post-fill deviations represent a practical source of error in temperature measurements in a hydrogen tank that may result from, for example, thermocouple placement, temperature gradients within the tank and/or time lag. Given these errors, however, the actual fill result was still remarkably close to the target, further validating the model. Additionally, 85° C. was not utilized as a stop point in these fills, thereby allowing the tanks to reach temperatures slightly above 85° C. These minor temperature deviations were not considered problematic because transient temperatures above 85° C. are generally known and allowed pursuant to SAE J2579, the disclosure of which is incorporated by reference, in its entirety.

The results of a 70 MPa Type 4 Tank Confirmation Test are illustrated in FIG. 18. As reflected in the illustrated data, the 70 MPa tank test temperature result was an essentially perfect match for the calculated $T_{final}$ Target.

Figure 19:
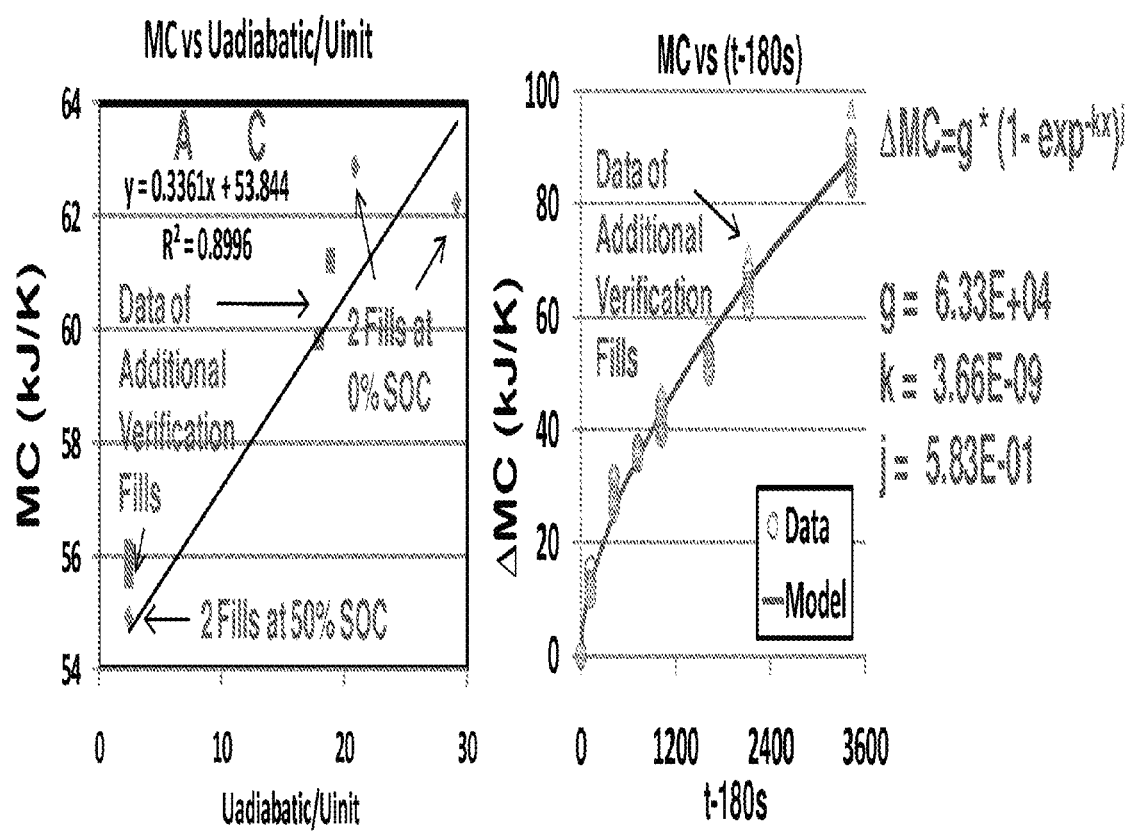
FIG. 19 illustrates Calculation of the Constants of the MC Equation (Equation [11]) for the Type 3 Tank shows that the data generated during verification filling under different conditions compliments the data that was used to generate the constants originally. The model is robust to different conditions.

Comparing the data obtained from the 4 test fills used to generate the constants of Equation [11] to the data generated in the fifth verification fill and additional verification fills, the results reinforce the concept that the MC is characteristic for the tank and can be used to predict the fueling result. This is demonstrated in the graphs illustrated in FIG. 19 in which the data generated during the Type 3 Tank confirmation tests detailed above is consistent with the data used in determining appropriate values for the various constants utilized in Equation [11]. These results demonstrate that the MC Method is sufficiently robust to be applied confidently across a range of tank configurations and operating conditions.

Figure 20:
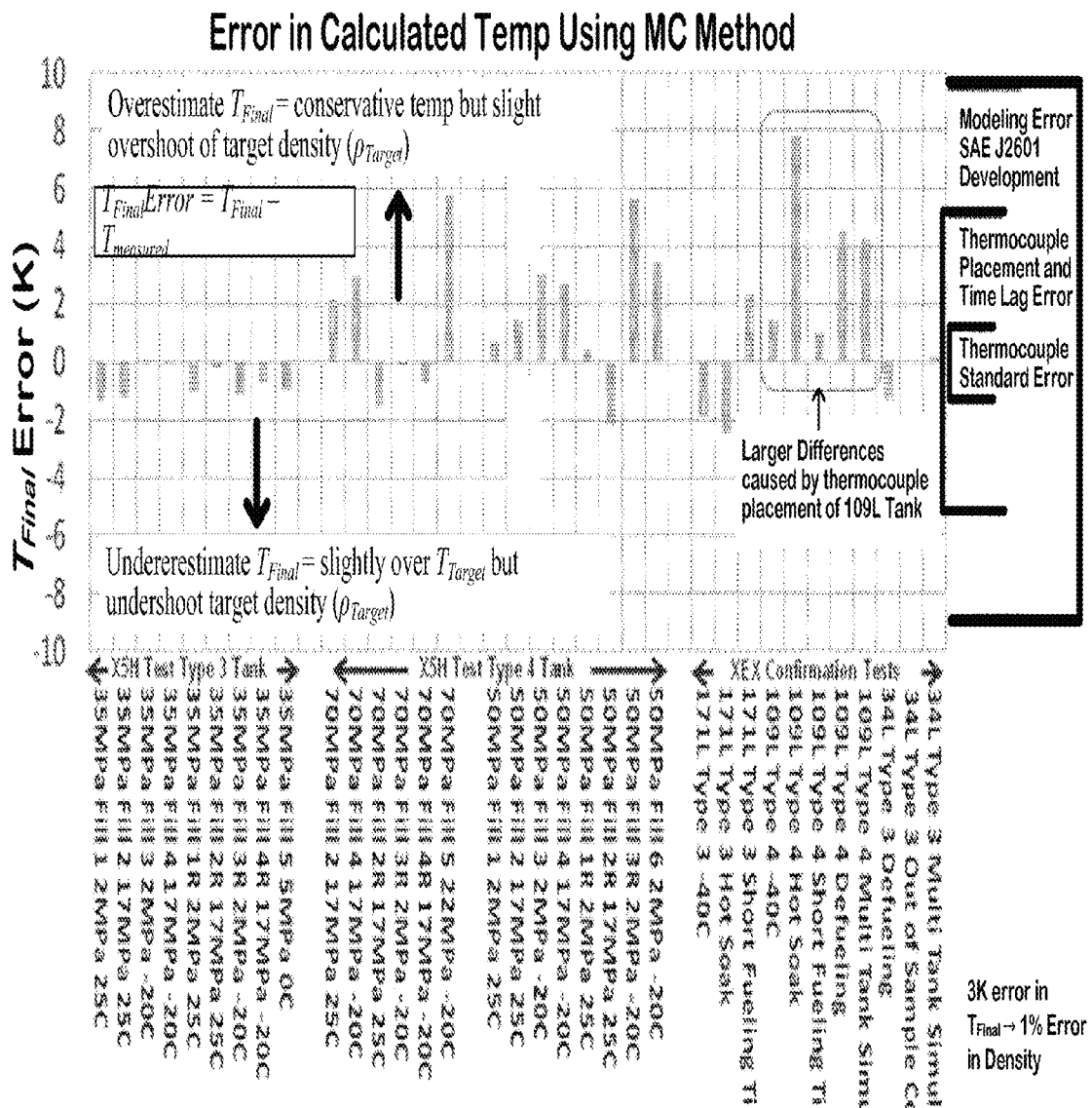
FIG. 20 illustrates Error between $T_{final}$ as calculated by the MC Method and the actual measured final temperature at the end of the fill.

Looking at the error from all of the fills conducted, as illustrated in FIG. 20, it is apparent that the MC Method yields very accurate results for Type 3 and Type 4 tanks, typically falling within a range consistent with that expected from variations in thermocouple placement and/or time lag errors. As shown in FIG. 20, the MC Method Model error is the difference between $T_{final}$ as calculated by the MC Method, and the actual final temperature result measured at the end of the fill procedure. The actual pre-cooling temperature of the station was used as the input to the enthalpy calculation rather than the pre-cooler set point, for the reasons described supra. Known or suspected sources of error include, for example:
  errors of the calculation in average enthalpy used,
  calculation in mass of hydrogen delivered,
  measurement of ambient temperature,
  measurement of initial tank pressure,
  measurement of final tank pressure,
  measurement of final tank temperature (thermocouple placement, lag, standard error)
  calculation of the MC from the best-fit coefficients, and
  difference between actual fill time and expected fill time (due to station bank switching, flow differences, etc.),
  heat transfer in or out of the hydrogen stream after the station enthalpy measurement, and/or
  differences in the actual tank temperature from the assumed ambient temperature (hot spots, cold spots, etc.)

Given all of these possible sources of error, it is remarkable that the data generated during testing suggests that a lumped heat capacity model can achieve a standard deviation of errors of 0.6K for Type 3 Tanks and 2.4K for Type 4 Tanks. The "Definition Error" as shown in FIG. 20 removes the error in calculating enthalpy, calculating mass, and calculating MC coefficients by using the test data to determine the actual heat transfer, the actual average enthalpy of the fill, and the actual MC value, and using those to calculate $T_{final}$. This removes substantially all of the errors and approximations attributable to the calculations of the MC Method itself, leaving only the measurement errors as the source of error. This has a standard deviation of 0.3K for the Type 3 tank and 1.3K for the Type 4 tank. The remaining portion of the errors is likely a result of measurement errors, thermocouple lag and/or differences between the assumed and actual conditions (such as cold spots in the tank after defueling). It was noted that as the pace of the testing increased the magnitude of the errors also tended to increase, possibly as the result of differences between the assumed and actual conditions including, for example, residual cold spots remaining from the defueling operations conducted between filling tests.

A sensitivity analysis of the MC Method to variations in input errors was conducted to examine the correspondence between known levels of input errors and the resulting output errors. As reflected in the data presented in FIG. 21, the MC Method was relatively resistant to input errors with Type 3 tanks being more sensitive to variations in the initial temperature measurements while Type 4 tanks are more sensitive to variations in the temperature measurement of the flow stream at the station. 10K errors in the initial temperature measurement leads to 6K errors in $T_{final}$ for both Type 3 and Type 4 tanks. 10K errors in the hydrogen temperature measurement at the station (used for the average enthalpy approximation) lead to $T_{final}$ error of 6K for Type 3 tanks and 8K for Type 4 tanks. 10% errors in the calculated MC coefficients lead to errors of around 3K (and 3K represents approximately a 1% error in the density of hydrogen). These results demonstrate that the MC Method has significant robustness to accurately describe vehicle fueling over a range of conditions and suppress the effect of input errors.

As detailed above, utilizing the MC Method for refining Fueling Protocols can improve fueling performance. Although an ID Fill fueling protocol was discussed supra, the MC Method may also be applied to conventional non-communication fueling operations, as well as full communication fueling operations, as currently defined in SAE TIR J2601. A comparison of fueling methods is shown in FIG. 22, which highlights the benefits that could be expected to flow from incorporating the MC Method into all three types of fueling (i.e., ID Fill, Non-Communication and Full-Communication). These benefits are further elaborated upon in the discussion provided infra.

In an ID Fill configuration, the fueling process is better adapted to the tank that is being fueled, thus tending to provide reduced fueling time and increased SOC within the bounds of the uncertainties of the initial conditions of the tank and the measurements at the station. The fueling process is also better adapted to the station's real time capabilities, thereby increasing operational flexibility and avoiding the rigid, preset, tightly bounded temperature requirements corresponding to the various station types as defined in SAE TIR J2601. The MC Method allows the filling process to self-adjust to the current fueling capabilities of the station, thereby providing the potential for simpler, more flexible and less costly hydrogen filling stations. The flexibility of the MC Method allows a hydrogen filling station to be "tuned" to the current operating environment which, in turn, may allow for increased pre-cooling temperatures while still maintaining generally acceptable fueling times under most conditions. The ability to run at higher pre-cooling temperatures can improve station efficiency, lower costs and maintain customer satisfaction.

Fueling processes incorporating the MC Method as detailed supra could eliminate the need for the look-up tables currently utilized for non-communication fueling in accord with SAE TIR J2601, resulting in the same benefits as outlined above. The non-communication fueling operations could include calculations of the MC Parameters of the boundary condition tanks utilized in building the non-communication look-up tables. When operating at the Type A (−40° C.) or Type B (−20° C.) pre-cooling temperatures, the resulting range of fueling rates and pressure targets would be expected to be substantially the same, if not identical, to those defined in the look-up tables.

The flexibility of the MC Method in addressing variations in temperature and pressure would reduce or eliminate the need for rigid definitions of Station Types as currently applied and would allow each station to operate more efficiently for its current environment, and to dispense fuel at improved rates, regardless of its pre-cooling temperature. Conversely, non-communication processes as defined in SAE TIR J2601 must operate within very tight pre-cooling tolerances, and if it falls outside them, cannot dispense fuel (resulting in unhappy customers) until its margins are back within the specified range(s).

The MC Method fueling process can also be utilized with full communication fueling, resulting in a number of benefits. SAE TIR J2601 currently defines two types of communication fueling including 1) a Default method in which fueling rates are the same as the non-communication fueling rates defined in the look-up tables and 2) an Alt Method in which a more aggressive fueling rate can be utilized in those instances in which a vehicle Temperature Signal can be utilized in a feedback loop to regulate the fueling rate in order to suppress or avoid an overheat condition. With the MC Method, the fueling rate is determined at the beginning of the fill, just as described above, and is also checked during the fill based on the actual enthalpy of hydrogen delivered during the fill. With communications fueling, the initial and transient conditions can be more tightly defined, giving even better results. Incorporation of the MC Method would mean that the Default and Alt Methods would no longer be needed—a single communications fueling protocol could be defined and it would be adapted for the vehicle being fueled and the fueling conditions.

From a safety standpoint, the MC Method allows an additional cross check on the Temperature Signal received from the vehicle. Because the station can calculate the expected temperature from the MC parameters and delivered enthalpy, it can cross reference this with the temperature signal from the vehicle. The temperature signal at the beginning of the fill procedure is generally constant so by using the actual measured initial temperature and the characteristic MC parameters, the vehicle fueling protocol can be fully defined, and higher quality fill results can be achieved (as reflected in both SOC and fill time).

The MC Method Fueling Protocol can be utilized comprehensively by the station, for Identification Fueling, Non-Communication Fueling and Full Communication Fueling, resulting in a fill protocol that is better adapted to the current capabilities of both the vehicle and the hydrogen filling station capabilities and takes into account the current operating environment to achieve higher quality fills.

Figure 21:
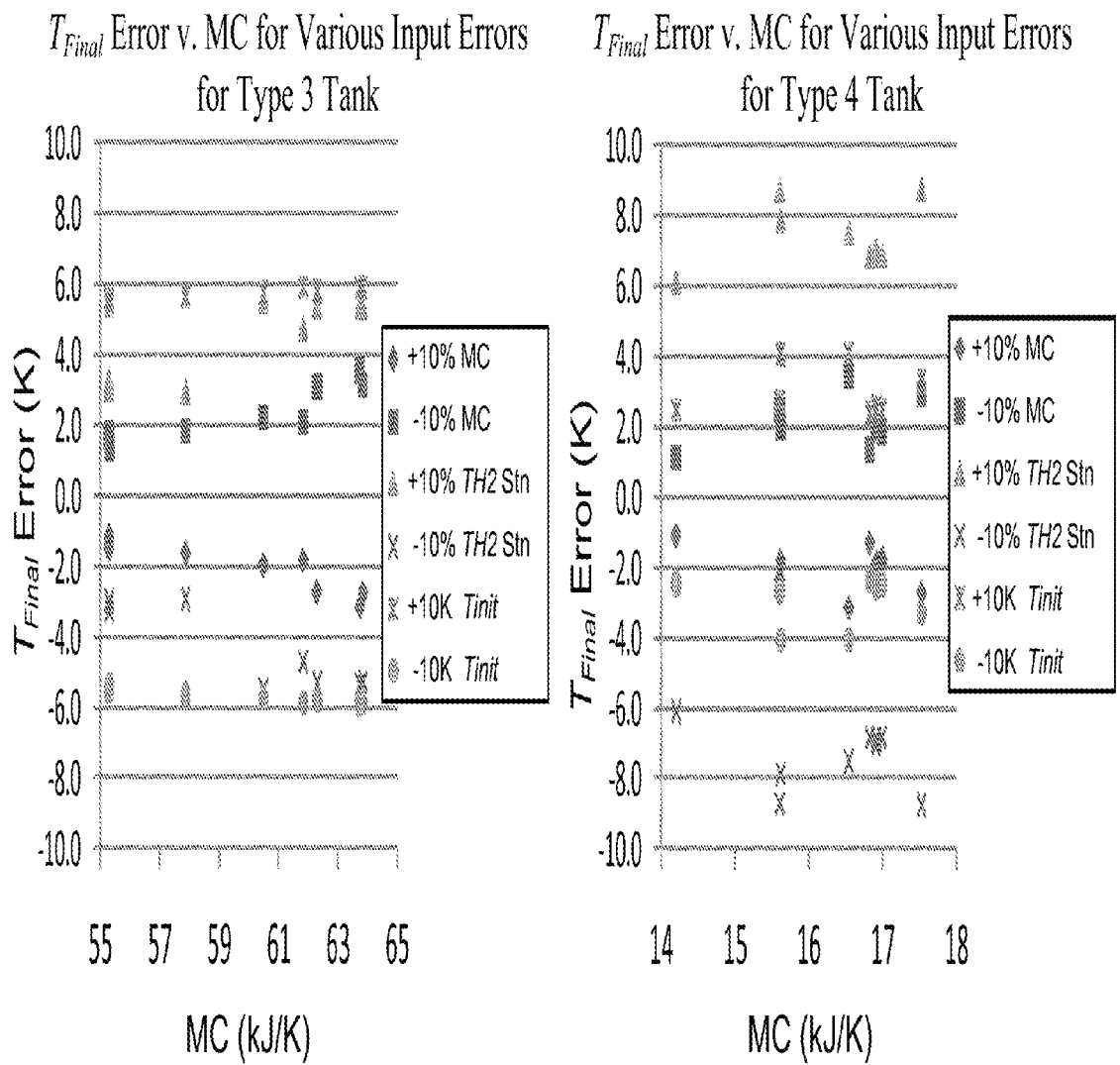
FIG. 21 illustrates a Sensitivity Analysis of Type 3 and Type 4 Tanks to Input Errors Using the MC Method.

An aspect of using the MC Method is the accurate prediction of the mass average enthalpy that will be delivered to the tank during a refueling procedure or event. As shown in FIG. 21, a 10K error in the mass average temperature can result in a 6K to 8K error in $T_{final}$, so it is important to accurately predict the enthalpy of the upcoming fill. In connection with the MC Method testing, a Runge-Kutta approximation was developed for average hydrogen enthalpy at the nozzle from stations using pre-cooling as illustrated below in Equation [12].

$$\bar{h} = \frac{1}{4}\left[\begin{array}{l}\left(\dfrac{h(T_{precooling},(P_{StationInit}))+}{h\left(T_{precooling},\left(P_{StationInit}+\dfrac{P_{StationFinal}-P_{StationInit}}{4}\right)\right)}{2}\right)+ \\ \left(\dfrac{h\left(T_{precooling},\left(P_{StationInit}+\dfrac{P_{StationFinal}-P_{StationInit}}{4}\right)\right)+}{h\left(T_{precooling},\left(P_{StationInit}+2\dfrac{P_{StationFinal}-P_{StationInit}}{4}\right)\right)}{2}\right)+ \\ \left(\dfrac{h\left(T_{precooling},\left(P_{StationInit}+\dfrac{P_{StationFinal}-P_{StationInit}}{4}\right)\right)+}{h\left(T_{precooling},\left(P_{StationInit}+3\dfrac{P_{StationFinal}-P_{StationInit}}{4}\right)\right)}{2}\right)+ \\ \left(\dfrac{h\left(T_{precooling},\left(P_{StationInit}+3\dfrac{P_{StationFinal}-P_{StationInit}}{4}\right)\right)+}{h\left(T_{precooling},\left(P_{StationInit}+4\dfrac{P_{StationFinal}-P_{StationInit}}{4}\right)\right)}{2}\right)\end{array}\right] \quad [12]$$

Where
$T_{precooling}$ = Expected Precooling Temperature
$P_{StationInit} = P_{init} + \Delta P_{StationInit}$ = Initial Hydrogen Tank Pressure+Initial Station Pressure Drop
$P_{StationFinal} = P_{Final} + \Delta P_{StationFinal}$ = Final Hydrogen Tank Pressure+Final Station Pressure Drop During testing, it was found that $\Delta P_{StationInit}$=5 MPa if the initial tank pressure was 2 MPa, 2 MPa if the initial tank pressure was 17 MPa, and 1 MPa at higher initial pressures. $\Delta P_{StationFinal}$ was assumed to be 1 MPa in all cases. Therefore, the algorithm may be modified to reflect, more accurately, the conditions and performance of a particular station. In an illustrative example, the station builder or operator may modify the algorithm to more accurately reflect the conditions and performance of the station.

During several test fills, deviations were noted between the pre-cooler output temperature and the actual temperature delivered at the nozzle. These deviations tended to follow a relationship with mass flow rate and pre-cooling level as illustrated in FIG. 23. In general, the higher flow rates and/or larger differences between the pre-cooling and ambient temperatures will be reflected in greater temperature deviations between the nozzle temperature and the pre-cooler set temperature. Therefore, such factors can be taken into account in the MC Method. In a non-limiting example, each station builder or operator may determine this relationship(s) for the range of expected operating conditions and parameters in order to select an appropriate pre-cooling level that will typically provide customer friendly refueling times. This flexibility is one of the benefits of the MC Method—it allows the station to calculate the appropriate fill time for a particular pre-cooling temperature based on the conditions of that fill and the capabilities of the tank itself.

The algorithms utilized in practicing the MC Method are provided below. As the vehicle approaches the hydrogen filling station, the vehicle provides the station, via RFID, IRDA or other communication method, parametric data for a MC Method fill procedure. The parametric data can include, for example:
NWP
Tank Volume (or the station can calculate it with a pressure pulse)
Hot Soak Assumption
Cold Soak Assumption
Constants of MC Equation Other parameters as desired (Max Temp Allowed, Fastest Fill Rate Allowed, Max $\rho_{Target}$ Allowed, etc.)

Even if none of the parameters are communicated, the station can use the MC Method to conduct the fill by utilizing default Constants of the MC Equation as derived from SAE TIR J2601, and the default Hot Soak, Cold Soak assumptions of SAE TIR J2601.

Step 1—Calculate the Fueling Time Using Hot Soak Assumption $$T_{init} = T_{ambient} + \Delta T_{hot}$$

$$\Delta t = 0$$

$$m_{init} = V \times \rho_{initial}(T_{initial}, P_{initial})$$

$$m_{cv} = V \times \rho_{target}$$

$$m_{add} = m_{cv} - m_{initial}$$

$$u_{initial} = u_{initial}(T_{initial}, P_{initial})$$

$$h_{average} = \frac{\sum m_{add} h_i(T, P)}{m_{add}}$$

$$u_{adiabatic} = \frac{m_{initial} u_{initial} + m_{add} h_{average}}{m_{cv}}$$

$$T_{adiabatic} = T(\rho_{target}, P_{adiabatic}, u_{adiabatic})$$

$$MC = C + A\frac{U_{adiabatic}}{U_{init}} + g(1 - e^{-k\Delta t})^j$$

$$T_{Final} = \frac{m_{cv} C_v T_{Adiabatic} + MC T_{Initial}}{(MC + m_{cv} C_v)}$$

If $T_{final}$>85 C (or other user specific limit), $\Delta t = \Delta t + 10$ s.

Iterate from the top of Step 1.

As a practical measure, $P_{adiabatic}$ can be assumed to be the MAWP with only a very small error, since internal energy has a very weak relationship with pressure.

Step 2—Calculate the Pressure Target Using Cold Soak Assumption $$T_{init} = T_{ambient} - \Delta T_{cold}$$

$$m_{init} = V \times \rho_{initial}(T_{initial}, P_{initial})$$

$$m_{add} = m_{cv} - m_{initial}$$

$$u_{initial} = u_{initial}(T_{initial}, P_{initial})$$

$$h_{average} = \frac{\sum m_{add} h_i(T, P)}{m_{add}}$$

$$u_{adiabatic} = \frac{m_{initial} u_{initial} + m_{add} h_{average}}{m_{cv}}$$

$$T_{adiabatic} = T(\rho_{target}, P_{adiabatic}, u_{adiabatic})$$

$$MC = C + A\frac{U_{adiabatic}}{U_{init}} + g(1 - e^{-k\Delta t})^j$$

$$T_{Final} = \frac{m_{cv} C_v T_{Adiabatic} + MC T_{Initial}}{(MC + m_{cv} C_v)}$$

$$P_{Target} = P(\rho_{target}, T_{Final}) \text{ and } \rho_{target} = 100\% \text{ } SOC$$

$$CPRR = \frac{P_{Target} - P_{init}}{180s + \Delta t}$$

Step 3 (if Necessary)—Calculate the Expected Result $$T_{init} = T_{ambient}$$

$$m_{init} = V \times \rho_{initial}(T_{initial}, P_{initial})$$

$$m_{cv} = V \times \rho_{target}$$

$$m_{add} = m_{cv} - m_{initial}$$

$$u_{initial} = u_{initial}(T_{initial}, P_{initial})$$

$$h_{average} = \frac{\sum m_{add} h_i(T, P)}{m_{add}}$$

$$u_{adiabatic} = \frac{m_{initial} u_{initial} + m_{add} h_{average}}{m_{cv}}$$

$$T_{adiabatic} = T(\rho_{target}, P_{adiabatic}, u_{adiabatic})$$

$$MC = C + A\frac{U_{adiabatic}}{U_{init}} + g(1 - e^{-k\Delta t})^j$$

$$T_{Final} = \frac{m_{cv} C_v T_{Adiabatic} + MC T_{Initial}}{(MC + m_{cv} C_v)}$$

$$p_{Target} = P(\rho_{target}, T_{Final})$$

If $P_{Target}$>$P_{TargetColdSoak}$, $\rho_{Target}$=$\rho_{Target}$−0.001g/L.

Iterate From the Top of Step 3.

A hydrogen station can maintain a database of MC parameters that have been communicated to the station, and use the lowest performing MC parameter, tank volume, and lowest initial SOC % historically observed, to set the pre-cooling temperature for the system in order to achieve a fast fueling rate given ambient temperature. In this way a station can keep the pre-cooling temperature set at an economically optimal level.

Although the MC Method was developed and has been described with an emphasis on filling vehicle hydrogen tanks at hydrogen filling stations, modification of the MC Method to improve its performance in connection with fueling hydrogen busses or fueling systems with cryogenic gasses or liquids is certainly contemplated. Similarly, it is anticipated that the basic MC Method could readily be adapted for use in conjunction with compressed natural gas vehicle fueling, or fast filling of vessels involving any industrial gas and/or for calculating the resulting temperature of any process in which a pressurized gas is injected into a pressure vessel. The applicability of the MC Method and the associated constants reflecting the thermodynamic properties and behavior for other processes can be determined by applying a similar test matrix as set out above in connection with compressed hydrogen tank refueling for automobiles.

We claim:

1. A method of operating a hydrogen gas filling station comprising:
    obtaining a first set of parametric data corresponding to a hydrogen powered vehicle;
    obtaining a second set of parametric data corresponding to station capabilities;
    obtaining a third set of parametric data corresponding to a refueling ambient temperature;
    calculating an MC value based on the parametric data obtained; and
    determining a projected fill time that is predicted to produce a gas final temperature $T_{final}$ no greater than a target temperature T and achieve a state of charge of 100% within a tank according to:

$$T_{Final} = \frac{m_{cv}C_v T_{Adiabetic} + MCT_{Initial}}{(MC + m_{cv}C_v)};$$

and determining a target pressure $P_{target}$ that is predicted to produce the state of charge of 100% within the tank.

2. The method of operating a hydrogen gas filling station according to claim 1, wherein:
the first set of parametric data is obtained directly from the hydrogen powered vehicle using a communication protocol selected from a group consisting of RFID, HVAS and IRDA.

3. The method of operating a hydrogen gas filling station according to claim 1, wherein:
the first set of parametric data is obtained by identifying the hydrogen powered vehicle and accessing a parametric database maintained outside the vehicle.

4. The method of operating a hydrogen gas filling station according to claim 1, wherein:
the first set of parametric data is assigned default values and
determining an adjusted final target density sufficient to achieve the $P_{target}$ at the $T_{final}$.

5. The method of operating a hydrogen gas filling station according to claim 1, wherein:
the first set of parametric data includes at least one parameter selected from a group consisting of nominal working pressure, tank volume, refueling history, time stamp of last refueling, trip odometer value, initial hydrogen mass, initial gas temperature, maximum hot soak temperature, maximum cold soak temperature, maximum defueling rate and maximum fueling rate.

6. The method of operating a hydrogen gas filling station according to claim 1, further comprising:
maintaining first and second hydrogen fill assemblies, the first hydrogen fill assembly operating at a first pre-cooling temperature and the second hydrogen assembly operating at a second pre-cooling temperature, the first and second pre-cooling temperatures not being equal;
analyzing the first set of parametric data; and
directing the hydrogen powered vehicle to the hydrogen fill assembly that can more efficiently provide a state of charge of 100%.

7. The method of operating a hydrogen gas filling station according to claim 1, further comprising:
calculating a target pre-cooling temperature sufficient to achieve a 3-minute fueling time using parametric information selected from a data set consisting of vehicle fueling history, tank volume, lowest historical initial state-of-charge percent, lowest historical tank MC value, and ambient temperature;
setting and maintaining a hydrogen fill assembly at the target pre-cooling temperature for the duration of a vehicle refueling operation.

8. The method of operating a hydrogen gas filling station according to claim 1, further comprising:
predicting a defueled system temperature for a combined system heat mass; setting $T_{FinalDefuelCold}$; and
initiating refueling using $T_{FinalDefuelCold}$.

9. The method of operating a hydrogen gas fill station according to claim 1, further comprising:
obtaining a first subset of the first set of parametric data, the first subset corresponding to parametric data associated with a first hydrogen tank onboard the hydrogen powered vehicle;
obtaining a second subset of the first set of parametric data, the second subset corresponding to parametric data associated with a second hydrogen tank onboard the hydrogen powered vehicle;
calculating $T_{final1}$ using the first subset of parametric data and $T_{final2}$ using the second subset of parametric data;
using the greater of $T_{final1n}$ and $T_{final2}$ to determine a target fueling speed; and
using the lesser of $T_{final1}$ and $T_{final2}$ to determine $P_{target}$.

10. The method of operating a hydrogen gas fill station according to claim 1, further comprising:
initiating a hydrogen gas fill;
adjusting the second set of parametric data during the hydrogen gas fill to reflect measured station performance;
adjusting the MC value during the hydrogen gas fill to reflect variations in the first set of parametric data and measured fill performance data;
calculating an adjusted fill time and $P_{target}$ to reflect adjustments in the second set of parametric data and MC value; and
using the adjusted fill time to control the fill speed and end of fill conditions.

11. The method of operating a hydrogen gas fill station according to claim 6, wherein:
the more efficient hydrogen fill assembly provides a benefit selected from a group consisting of reduced fueling time, higher state-of-charge percent, increased pre-cooling temperature, reduced energy consumption and combinations thereof.

12. The method of operating a hydrogen gas filling station according to claim 1, the step of obtaining the first set of parametric data corresponding to the hydrogen powered vehicle further comprising:
retrieving refueling time stamp data for the hydrogen powered vehicle.

13. The method of operating a hydrogen gas filling station according to claim 12, wherein;
the refueling time stamp data is retrieved from a HVAS RFD tag associated with the hydrogen powered vehicle.

14. The method of operating a hydrogen gas filling station according to claim 12, wherein:
determining an elapsed time from the refueling time stamp data; and
adjusting fueling speed to allow for a higher refueling speed for a longer elapsed time.

* * * * *